US012198505B2

(12) United States Patent
Fulton et al.

(10) Patent No.: US 12,198,505 B2
(45) Date of Patent: Jan. 14, 2025

(54) SYSTEM AND METHOD FOR PARI-MUTUEL GAMING

(71) Applicant: Castle Island IP Holding LLC, Charlottesville, VA (US)

(72) Inventors: Dan Fulton, Lancaster, PA (US); Josh Larson, Zeeland, MI (US)

(73) Assignee: CASTLE ISLAND IP HOLDINGS LLC, Charlottesville, VA (US)

( * ) Notice: Subject to any disclaimer, the term of this patent is extended or adjusted under 35 U.S.C. 154(b) by 0 days.

(21) Appl. No.: 18/302,389

(22) Filed: Apr. 18, 2023

(65) Prior Publication Data

US 2023/0252857 A1 Aug. 10, 2023

Related U.S. Application Data

(63) Continuation of application No. 17/102,074, filed on Nov. 23, 2020, now Pat. No. 11,651,655.

(60) Provisional application No. 62/939,357, filed on Nov. 22, 2019, provisional application No. 62/939,340, filed on Nov. 22, 2019.

(51) Int. Cl.

*G07F 17/00* (2006.01)
*G07F 17/32* (2006.01)
*G07F 17/34* (2006.01)

(52) U.S. Cl.

CPC ...... *G07F 17/3288* (2013.01); *G07F 17/3209* (2013.01); *G07F 17/3211* (2013.01); *G07F 17/3213* (2013.01); *G07F 17/323* (2013.01); *G07F 17/3244* (2013.01); *G07F 17/3276* (2013.01); *G07F 17/34* (2013.01)

(58) Field of Classification Search

None

See application file for complete search history.

(56) References Cited

U.S. PATENT DOCUMENTS

| | | | |
|---|---|---|---|
| 4,874,177 | A | 10/1989 | Girardin |
| 5,275,400 | A | 1/1994 | Weingardt et al. |
| 5,411,258 | A | 5/1995 | Wilson et al. |
| 5,830,068 | A | 11/1998 | Brenner et al. |
| 5,957,775 | A | 9/1999 | Cherry |
| 5,997,400 | A | 12/1999 | Seelig et al. |
| 6,120,376 | A | 9/2000 | Cherry |
| 6,152,822 | A | 11/2000 | Herbert |

(Continued)

FOREIGN PATENT DOCUMENTS

| | | |
|---|---|---|
| AU | 758508 B2 | 3/2003 |
| AU | 784601 B2 | 5/2006 |

(Continued)

*Primary Examiner* — Paul A D'Agostino
(74) *Attorney, Agent, or Firm* — Workman Nydegger

(57) ABSTRACT

An improved gaming system comprising at least one gaming machine and a central controller. The gaming machine may conduct wagering on an event or set of events for a player, conducting a wager including receiving a wager value and a predicted ranking from the player and transmitting the wager to the central controller. The central controller accessing a database to automatically retrieve data about one or more events that occurred in the past and included multiple participants for creating a plurality of binary scorecards. The central controller matching the predicted ranking to a scorecard and determining a reward value based on an award level of the scorecard and tier levels of a pari-mutuel pool.

24 Claims, 10 Drawing Sheets

(56) References Cited

U.S. PATENT DOCUMENTS

| | | | | |
|---|---|---|---|---|
| 6,166,736 | A | 12/2000 | Hugh | |
| 6,252,597 | B1 | 6/2001 | Lokuge | |
| 6,309,307 | B1 | 10/2001 | Krause et al. | |
| 6,358,150 | B1 | 3/2002 | Mir et al. | |
| 6,450,887 | B1 | 9/2002 | Mir et al. | |
| 6,544,121 | B2 | 4/2003 | Deweese et al. | |
| 6,554,709 | B1 | 4/2003 | Brenner et al. | |
| 6,786,824 | B2 | 9/2004 | Cannon | |
| 6,837,791 | B1 | 1/2005 | McNutt et al. | |
| 6,887,156 | B2 | 5/2005 | Deweese et al. | |
| 6,893,018 | B2 | 5/2005 | Inoue | |
| 7,027,463 | B2 | 4/2006 | Mathew et al. | |
| 7,264,546 | B2 | 9/2007 | Marshall et al. | |
| 7,379,886 | B1 | 5/2008 | Zaring et al. | |
| 7,454,380 | B2 | 11/2008 | Garahi et al. | |
| 7,628,695 | B2 | 12/2009 | Lee | |
| 7,645,191 | B1 | 1/2010 | McKeever | |
| 7,648,414 | B2 | 1/2010 | McNutt et al. | |
| 7,774,259 | B1 | 8/2010 | Satterfield et al. | |
| 7,775,880 | B2 | 8/2010 | Downes | |
| 7,892,092 | B2 | 2/2011 | Matthews et al. | |
| 7,950,990 | B2 | 5/2011 | Marshall et al. | |
| 7,996,296 | B2 | 8/2011 | Lange | |
| 8,029,352 | B2 | 10/2011 | Lind et al. | |
| 8,081,846 | B2 | 12/2011 | Ignatchenko et al. | |
| 8,083,584 | B2 | 12/2011 | Greiner et al. | |
| 8,118,675 | B2 | 2/2012 | Horowitz et al. | |
| 8,221,225 | B2 | 7/2012 | Laut | |
| 8,241,110 | B2 | 8/2012 | Katz et al. | |
| 8,277,296 | B2 | 10/2012 | Okada | |
| 8,292,729 | B2 | 10/2012 | Vlazny et al. | |
| 8,342,959 | B2 | 1/2013 | Mahaffey et al. | |
| 8,360,835 | B2 | 1/2013 | Strause et al. | |
| 8,370,249 | B2 | 2/2013 | Lange et al. | |
| 8,419,544 | B2 | 4/2013 | McNutt et al. | |
| 8,532,798 | B2 | 9/2013 | Ferraro, III et al. | |
| 8,597,109 | B2 | 12/2013 | Herrmann et al. | |
| 8,636,571 | B2 | 1/2014 | Miller | |
| 8,684,847 | B2 | 4/2014 | Grundstedt et al. | |
| 8,777,735 | B1 | 7/2014 | Fine et al. | |
| 8,721,440 | B2 | 8/2014 | Ward et al. | |
| 8,814,668 | B1 | 8/2014 | Cornett | |
| 8,905,832 | B2 | 12/2014 | Miller | |
| 8,968,089 | B2 | 3/2015 | Miodunski | |
| 9,047,737 | B2 | 6/2015 | Brooks et al. | |
| 9,053,608 | B2 * | 6/2015 | Brooks | G07F 17/323 |
| 9,064,369 | B2 | 6/2015 | Schueller et al. | |
| 9,153,101 | B2 | 10/2015 | Cannon et al. | |
| 9,218,721 | B2 | 12/2015 | Herbert | |
| 9,251,547 | B2 | 2/2016 | Fontaine et al. | |
| 9,355,102 | B2 | 5/2016 | Thukral et al. | |
| 9,437,078 | B2 | 9/2016 | Keech | |
| 9,443,392 | B2 | 9/2016 | Keech | |
| 9,633,518 | B2 | 4/2017 | Herbert et al. | |
| 9,633,519 | B2 | 4/2017 | Zimmerl et al. | |
| 9,652,926 | B2 | 5/2017 | Gelman et al. | |
| 9,717,983 | B1 | 8/2017 | Pollowitz et al. | |
| 9,747,748 | B2 | 8/2017 | Corckran et al. | |
| 9,965,752 | B2 | 5/2018 | Schrotter et al. | |
| 10,229,556 | B2 | 3/2019 | Weber et al. | |
| 10,269,215 | B2 | 4/2019 | Prabhu | |
| 10,395,471 | B2 | 8/2019 | Lind et al. | |
| 10,553,077 | B2 | 2/2020 | Miller | |
| 10,818,126 | B2 | 10/2020 | Gelman et al. | |
| 10,909,796 | B2 | 2/2021 | Miller et al. | |
| 10,997,825 | B2 | 5/2021 | Neely et al. | |
| 11,004,310 | B2 | 5/2021 | McKeever et al. | |
| 11,055,967 | B2 | 7/2021 | Miller et al. | |
| 11,069,184 | B2 | 7/2021 | Lind et al. | |
| 11,074,787 | B1 | 7/2021 | Huke et al. | |
| 11,100,753 | B1 | 8/2021 | Huke et al. | |
| 11,189,133 | B2 | 11/2021 | Neely et al. | |
| 11,189,134 | B2 | 11/2021 | Neely et al. | |
| 2001/0016509 | A1 | 8/2001 | Kusuda | |
| 2001/0039209 | A1 | 11/2001 | Deweese et al. | |
| 2002/0187836 | A1 | 12/2002 | Meyer | |
| 2003/0190953 | A1 | 10/2003 | Deweese et al. | |
| 2004/0229671 | A1 | 11/2004 | Stronach et al. | |
| 2005/0063365 | A1 | 3/2005 | Mathew et al. | |
| 2005/0101385 | A1 | 5/2005 | Kido | |
| 2005/0102223 | A1 * | 5/2005 | Vlazny | G06Q 50/34 705/37 |
| 2005/0125685 | A1 | 6/2005 | Samuelsson et al. | |
| 2005/0170886 | A1 | 8/2005 | Miller | |
| 2005/0176496 | A1 | 8/2005 | Stronach | |
| 2005/0203651 | A1 | 9/2005 | Vincenzini | |
| 2006/0035712 | A1 | 2/2006 | Eastman et al. | |
| 2006/0205483 | A1 * | 9/2006 | Meyer | G06Q 20/06 463/25 |
| 2006/0246990 | A1 | 11/2006 | Downes | |
| 2006/0279834 | A1 | 12/2006 | Eiselt | |
| 2007/0197281 | A1 | 8/2007 | Stronach | |
| 2007/0225069 | A1 | 9/2007 | Garahi et al. | |
| 2008/0214290 | A1 | 9/2008 | Lee | |
| 2008/0227532 | A1 | 9/2008 | Gelman et al. | |
| 2008/0234051 | A1 | 9/2008 | McNutt et al. | |
| 2008/0248846 | A1 * | 10/2008 | Stronach | G07F 17/3288 463/6 |
| 2009/0069077 | A1 | 3/2009 | Saito et al. | |
| 2010/0144428 | A1 | 6/2010 | Fontaine et al. | |
| 2010/0331066 | A1 | 12/2010 | Jung et al. | |
| 2011/0117981 | A1 | 5/2011 | Baerlocher et al. | |
| 2011/0250938 | A1 | 10/2011 | Bassignana et al. | |
| 2012/0028703 | A1 | 2/2012 | Anderson et al. | |
| 2013/0007648 | A1 | 1/2013 | Gamon et al. | |
| 2013/0053991 | A1 | 2/2013 | Ferraro, III et al. | |
| 2014/0066189 | A1 | 3/2014 | Brooks et al. | |
| 2014/0274343 | A1 | 9/2014 | Herbert | |
| 2014/0274390 | A1 | 9/2014 | Kasten | |
| 2014/0315609 | A1 | 10/2014 | Miller et al. | |
| 2015/0018085 | A1 | 1/2015 | Herbert | |
| 2015/0228163 | A1 | 8/2015 | Clarebrough et al. | |
| 2015/0262452 | A1 | 9/2015 | Corckran et al. | |
| 2015/0287278 | A1 | 10/2015 | Shore et al. | |
| 2015/0364009 | A1 | 12/2015 | Keech | |
| 2016/0189483 | A1 | 6/2016 | Ballman | |
| 2016/0273758 | A1 | 9/2016 | Fujimura | |
| 2017/0208249 | A1 | 7/2017 | Choi et al. | |
| 2017/0372561 | A1 | 12/2017 | Aronson et al. | |
| 2018/0154266 | A1 | 6/2018 | Greiner, Jr. et al. | |
| 2019/0035223 | A1 | 1/2019 | Parthimos | |
| 2019/0051099 | A1 | 2/2019 | Pawloski et al. | |
| 2019/0122502 | A1 | 4/2019 | Aronson et al. | |
| 2019/0251789 | A1 | 8/2019 | Waters | |
| 2019/0325707 | A1 | 10/2019 | Aronson et al. | |
| 2019/0340879 | A1 | 11/2019 | Williams et al. | |
| 2020/0027307 | A1 | 1/2020 | Lind et al. | |
| 2020/0175820 | A1 | 6/2020 | Miller et al. | |
| 2020/0286333 | A1 | 9/2020 | Waters | |
| 2021/0027569 | A1 | 1/2021 | Gelman et al. | |
| 2021/0217280 | A1 | 7/2021 | Lutnick et al. | |
| 2021/0241582 | A1 | 8/2021 | Neely et al. | |
| 2021/0256650 | A1 | 8/2021 | Huke et al. | |
| 2021/0286594 | A1 | 9/2021 | Lee et al. | |
| 2021/0287485 | A1 | 9/2021 | Asher et al. | |
| 2021/0287494 | A1 | 9/2021 | Amaitis et al. | |

FOREIGN PATENT DOCUMENTS

| | | | |
|---|---|---|---|
| AU | 2001233162 | B2 | 9/2006 |
| AU | 785176 | B2 | 10/2006 |
| AU | 2021215205 | A1 | 9/2021 |
| CA | 3107715 | A1 | 8/2021 |
| CN | 102883785 | A | 1/2013 |
| EP | 1076321 | A1 | 2/2001 |
| EP | 3859698 | A1 | 8/2021 |
| GB | 2591402 | A | 7/2021 |
| HK | 1220028 | A1 | 4/2017 |
| JP | 6903805 | B1 | 7/2021 |
| JP | 2021101355 | A | 7/2021 |
| JP | 6923835 | B1 | 8/2021 |
| JP | 2021117643 | A | 8/2021 |
| JP | 2021119540 | A | 8/2021 |
| KR | 20020088709 | A | 11/2002 |

(56) References Cited

FOREIGN PATENT DOCUMENTS

| | | | |
|---|---|---|---|
| KR | 20050074224 | A | 7/2005 |
| KR | 20080083955 | A | 9/2008 |
| KR | 101335418 | B1 | 12/2013 |
| KR | 101406340 | B1 | 6/2014 |
| WO | 0025876 | A1 | 5/2000 |
| WO | 0165507 | A2 | 9/2001 |
| WO | 0177964 | A2 | 10/2001 |
| WO | 0191872 | A1 | 12/2001 |
| WO | 0167352 | A8 | 2/2002 |
| WO | 0164305 | A8 | 3/2003 |
| WO | 2008024705 | A2 | 2/2008 |
| WO | 2014159971 | A1 | 10/2014 |
| WO | 2015076682 | A1 | 5/2015 |

* cited by examiner

DIVIDE POOL IN TIERS 750

752

| | TIER 1 | TIER 2 | TIER 3 | TIER 4 | TIER 5 |
|---|---|---|---|---|---|
| POOL VALUE | 807 | 23409 | 26745 | 8750 | MAX |

772

770

DETERMINE REWARD VALUE 760

| | MIN AWARD | TIER 1 | TIER 2 | TIER 3 | TIER 4 | TIER 5 |
|---|---|---|---|---|---|---|
| AWARD 1 | 75 | 0.112 | 0.005 | 0 | 0.1 | 0.028 |
| AWARD 2 | 175 | 0 | 0.011 | 0.007 | 0 | 0.018 |
| AWARD 3 | 200 | 0 | 0.013 | 0.011 | 0 | 0.018 |
| AWARD 4 | 810 | 0 | 0 | 0 | 0.025 | 0.018 |
| AWARD 5 | 825 | 0 | 0 | 0 | 0.025 | 0.018 |
| AWARD 6 | 850 | 0 | 0 | 0 | 0 | 0.018 |
| AWARD 7 | 860 | 0 | 0 | 0 | 0 | 0.018 |
| AWARD 8 | 250 | 0 | 0.011 | 0.015 | 0 | 0.018 |
| AWARD 9 | 300 | 0 | 0.034 | 0.027 | 0 | 0.018 |
| AWARD 10 | 325 | 0 | 0.043 | 0.03 | 0 | 0.018 |
| AWARD 11 | 350 | 0 | 0.051 | 0.041 | 0 | 0.018 |

780

FIG. 7

SYSTEM AND METHOD FOR PARI-MUTUEL GAMING

CROSS REFERENCE TO RELATED APPLICATIONS

This application is a continuation of U.S. application Ser. No. 17/102,074, filed Nov. 23, 2020, which claims the benefit of U.S. provisional application Nos. 62/939,357 filed Nov. 22, 2019, and 62/939,340 filed Nov. 22, 2019. The noted priority applications are incorporated herein by reference in their entirety.

FIELD OF THE DISCLOSURE

The field of the disclosure relates generally to methods for pari-mutuel gaming, and related systems for operation. The gaming methods are useable for enabling pari-mutuel wagering on past events and may be implemented on gaming consoles, mobile devices, personal computers, gaming machines or networked gaming machines, such as gaming machines found in casinos or betting environments.

BACKGROUND

Within the gambling or gaming industry, including sports betting, esports betting, games of chance, etc., traditional gaming machines include slot machines, poker machines, video lottery terminals, gaming consoles and similar devices. These traditional gaming machines are configured to provide an interface for wagering on game events and have a proven popularity. Players, however, quickly become tired of various adaptations of existing gaming machines, requiring the development of new and inventive ways to represent or play games on such gaming machines. For this reason, game creators must continually invent new and innovative ways to represent games and game play to stimulate players and encourage further interest.

Many traditional gaming machines rely on a display of a game of chance, for example games based on randomized events and/or fixed odds. These gaming machines employ lights, video displays, creative animations and sounds to engage a player's interest and may allow a player the opportunity to play independently of others at their own selected pace, placing wagers up to every few seconds. The display and individualized control of gameplay accommodate players that seek a game that provides more immediate and sustained rewards than traditional games of skill or strategy.

Many players prefer games with dynamic experiences where the gameplay experience changes automatically relative to the actions and wagers of other players. Traditional games of skill often involve multiple players and can introduce some variability in objectives and awards based on the input of the players, but require increased information, complex coordination methods and increased time to successfully conduct.

Efforts have been made to represent traditional games of skill or skills-based gaming formats in gaming machines, in order to combine the most appealing features of each. Unfortunately, existing efforts to develop a gaming machine or system capable of combining the advantages of traditional gaming machines and traditional games of skill have had only limited success. Existing methods are particularly limited by the information, coordination and time demands placed on the gaming machines in games of skill with multiple participants, and generally maintain a static experience for a player despite the involvement of other players.

These gaming machines often bodily incorporate a traditional multi-participant game, such as poker, into a video display that can allow a player the opportunity to place wagers that can be won or lost in a short period of time relative to the traditional game, possibly without the need for additional players, attendants, and the related delays in enjoyment of the game that other participants may cause.

For example, some existing gaming machines provide game outcomes which generally include a displayed set of reels appearing in columns having multiple symbols in each reel's symbol locations. Generally, players place wagers across fixed lines running left to right across the reels linking various symbols of the matrix, the wagers adding to a plurality of betting pools. Upon a wager being placed, the reels will briefly spin before coming to rest with a set of selected symbols being displayed based on the final result of an event. Symbol combinations along various pay lines are compared to winning combinations in a pay table with static prizes being awarded from the corresponding pool for matching combinations.

While players may select a variety of wager options on these gaming machines, such as by placing multiple wagers for a plurality of events or by the gaming machine dividing a wager into a plurality of wagers for a plurality of events, a player is generally limited to a single wager or award for each event or set of events from a distinct pool.

One disadvantage of the above described gaming machines is that they use a static pay table that limits variation of the game rewards. Another disadvantage of existing gaming machines is that they do not allow multiple wagers on a single event or set of events using the same pool. These restrictions essentially remove any dynamic interaction from a wagering game and prevent a player from enjoying variations in rewards and gameplay that could occur due to the participation of multiple players. Further, the maintenance of separate pools requires complex management systems and increased processing power, limiting the expansion of in-game variability due to processing constraints.

In view of the foregoing, there is a need for an improved gaming machine and method that incorporates the advantages of traditional games of skill in gaming machines, in order to combine the most appealing features of each. A need exists for an improved gaming machine capable of providing a user with a dynamic and changing gameplay that corresponds to the participation of multiple players, while presenting the information necessary for strategic wagering in an easy-to-use and understandable manner.

There is further a need for a gaming machine that is capable of presenting dynamic wager information and coordinating the participation of a plurality of players, without increasing the processing requirements of the gaming machine.

SUMMARY

The embodiments disclosed herein are directed to providing an improved gaming method and gaming machine that address the problems above and incorporate the advantages of traditional games of skill, and the entertaining features of traditional gaming machines in a single improved gaming machine. The embodiments may be employed to facilitate wagering on any outcome contest, including a historical outcome contest, past event and/or combination of events.

According to a first aspect of the disclosed embodiments there is provided a gaming system including a control device in communication with a plurality of gaming machines, each gaming machine comprising a display screen, a processor and an input device. The control device may include a processor and a memory, and may be configured to manage wagering from the plurality of gaming machines such as in the form of a totalizer.

To manage wagering from the plurality of gaming machines, the control device may create a plurality of scorecards corresponding to different possible final rankings of an event or a set of events having multiple participants or variables, for example historical horse-racing events or bingo cards. The plurality of scorecards may be tied to award levels or tier levels from a pool of a pari-mutuel betting system. To define a scorecard, the control device may assign a binary value to the places of the final ranking of the participants of the selected events, such that the scorecards are tied to predicting both correct or positive and incorrect or negative final rankings of the participants in the events.

The binary use of both positive and negatives in the scorecards allows for more variety in possible wagers and increased entertainment for a player. Rather than necessarily conditioning a reward to the player's prediction of the final ranking matching the final rankings of the events, scorecards considering both negative and positive selections according to embodiments of the present disclosure can provide a player with a variety of different challenges in the same game.

For instance, an award may be tied to predicting the results of a set of two events where the user must select the first, second and third finishers correctly in the first event but also incorrectly select the first, second and third finishers in the second event. Given these two events and the corresponding award, the gaming machine may create a binary scorecard assigning a (1) for a positive or correct selection and a (0) for a negative or incorrect selection such that the scorecard reads (111000) for the two events.

Variations in the scorecard with different combinations of positive and negative selections within the selected events may be tied to different award levels or award tiers within the pari-mutuel betting system which may be controlled by the control device or totalizer, allowing a player to pursue different predictions or award levels based on the fluctuations of a total pool value and minimizing the impact of cheating.

Each gaming machine may be configured to conduct wagering on the event or the set of events for a player, the process of conducting a wager including the processor accessing a database to automatically retrieve data about the one or more events which included multiple participants. The database may be provided in the control device or in the gaming machine, and the retrieved data may include both a final ranking of the participants in the events and listings of pertinent features of the participants in the events.

The gaming machines are able to display on the display screen a gaming interface presenting an entertaining display and a summary window comprising a view of variables related to the event or the set of events.

A player may conduct a wager by controlling the input device to accept a wager, including a wager value and a prediction of the final ranking, by selecting the final ranking of the participants in the events presented. In some embodiments, the player may control the input device to automatically select a prediction of the final ranking, corresponding to an automatic selection that is randomized or a based on a weighted probability such as handicapping from a ranking, i.e. race odds.

The gaming machine communicates the player's wager to the processor of the control device which may deduct a fee from the wager value and add the remaining wager value to a pari-mutuel pool. The processor of the control device compares the prediction of the final ranking to the plurality of scorecards. If the prediction of the final ranking input by the player matches a scorecard within the plurality of scorecards, the processor of the control device determines the award level of the scorecard and determines a reward value based on the award level of the scorecard and a tier level of the pari-mutuel pool.

According to embodiments of the gaming system, the processor of the control device is arranged to dynamically determine the reward value for the player's wager based on the award level of the scorecard and the activity of other players in the pari-mutuel pool. Rather than using a static rate for determining reward values associated with a given outcome as the pool value increases or decreases as implemented in existing gaming machines, the dynamic determination of the reward value according to the present disclosure may change distribution rates for each award level based on the total pool value by dividing the total pool value into tier levels having predetermined values.

The tier levels of the pari-mutuel pool are arranged to divide the total pool value into ranges of values that fill progressively. Each scorecard is associated with an award level having a minimum award value and a plurality of award rates corresponding to each of the tier levels, such that the marginal rate of a reward varies as the total pool value increases or decreases. When the prediction of the final ranking input by a player matches a scorecard, the processor of the control device identifies the award level of the scorecard and divides the pool value into the tier levels. The reward value for the player's wager comprises the minimum award value of the award level and a plurality of tier level values determined by applying the plurality of award rates of the award level to each of the corresponding tier levels.

By varying the award rates for the scorecards, or award levels, as the total pool value increases a player is continuously presented with changing gameplay reflective of the wagers of other players that pay into the pari-mutuel pool. The varying rates of the award levels can increase the relative value of different scorecards and motivate the player to change the objective of their wager, such as from picking the final ranking correctly to picking the final ranking incorrectly, depending on the total pool value and the associated tier levels.

The use of the tier levels also enables the gaming system to use a single pari-mutuel pool for the plurality of award levels rather than forming a plurality of pools associated with each award level or scorecard. In existing systems varying award rates are only accomplished by creating multiple pools but these pools are independent and a wager may only be applied to a single pool, resulting in slower, static growth of the pool values across a variety of wagers and a less dynamic system. Slower, static growth reduces the number of viable wager types and restricts the variability of gameplay available to players.

In some embodiments, the tier levels may be selected to create increasing variation in marginal rewards as the total pool increases, incentivizing variability in gameplay as the stakes and number of players increase. Alternatively, the tier levels may change quickly at low total pool values in order to incentivize more wagers and more quickly grow the pool.

According to the present disclosure, a player may also be enabled to place one or more wagers on the same event or set of events using the same pari-mutuel pool. Multiple wagers may correspond to different scorecards, or award levels, allowing for further variation in gameplay using the same event or set of events and reducing the amount of event data required to maintain the gaming system. The use of multiple wagers on the same event or set of events with a single pari-mutuel pool further provides advantages in certain regulatory schemes, such as by decreasing tax burdens on players.

In an alternative embodiment, a player may also be enabled to place one or more wagers on the same event or set of events using a plurality of pari-mutuel pools.

Following the determination of the reward value from the pari-mutuel pool, the reward value is communicated to the gaming machine and an entertaining display corresponding to the final result of the player's wager is created by the processor, based on whether and which scorecard the player's prediction matches as well as the tier levels of the pari-mutuel pool, and subsequently displayed for the player.

An entertaining display provides an improved user experience for the player using entertaining lights, sounds and animations that are configured to the tier level of the pari-mutuel pool and the final result of the player's wager. For example, increased music noise or animations may be provided to celebrate a winning wager of greater value, while an encouraging invitation to continue or comedic animation may be presented for a winning wager of lesser value or a losing wager. Entertaining displays according to the present disclosure may be presented in the display screen of the gaming machine and may further include mechanical components.

In one embodiment, a mechanical reel may be provided in the gaming machine having static displays configured to rotate at different rates. The processor of the gaming machine may be configured to control the rotation of the mechanical reel to align the resulting display of the reel with the final result of the player's wager.

In some embodiments, an entertaining display may include a separate component, such as a separate display screen or mechanical wheel separate from the gaming interface. A separate display screen may be provided as a video topper for displaying the award won by the player in a region of the gaming machine that is visible from surrounding areas, such as above the gaming interface, and may illustrate the tier level of the pari-mutuel pool and/or the final result of the player's wager in an entertaining manner.

In an embodiment, a mechanical wheel is provided with areas corresponding to a plurality of possible results of the player's wager. The mechanical wheel may be configured to rotate during the player's wager and be controlled by the processor of the gaming machine to align the resulting display of the wheel with the final result of the player's wager. The separate component of the entertaining display may be fixed on the gaming machine, or may be configured to turn and present the entertaining display in a rotating manner.

To facilitate a player's predictions of the final ranking for the selected events a variety of information on features of the participants may be presented in the gaming interface. Additional information may be presented relating to the scorecards available for a wager, as well as the associated reward values based on the current tier level of the pari-mutuel pool.

This information allows a player to employ a strategic element to their choice and allows the player to review the varying rewards available for a given scorecard, with the information presented on-demand in an easy to understand format according to the current disclosure. When the wager is completed the interface may present the final ranking of the participants and/or an indication of which of the player's predictions were correct or incorrect.

The interface may similarly be used to present an entertaining display related to the result of the player's wager and the associated reward, if any, in order to increase a player's enjoyment and engagement with the gaming machine. Players desire a balance between the information presented and the entertaining display provided in a gaming machine, but skilled persons have not ascertained a way to achieve this balance as conventional gaming machines require that a user switch between different interfaces.

Embodiments of the present disclosure advantageously provide an interface comprising an entertaining display and a summary window that are presented together in the display. The resulting interface according to embodiments of the disclosure may provide a dedicated space for each of the entertaining display and the summary window, with each being scaled to fit the size of the display screen. The summary window may present a limited view of variables and features related to the participants in the selected historical events.

One aspect of the disclosure provides a snapshot view of the features of each event, in which the snapshot view brings together in the summary window a limited list of commonly accessed features or information of events that progress during the course of the game. For instance, the summary window may present a snapshot of the player's predictions that have been made or remain to be made. When a player scrolls onto or selects the snapshot for an event within the summary window using the input device, the summary window may expand to launch a performance profile of the participants in the event.

A snapshot view may also be provided of the scorecards available for a wager and the reward value available for the wager, such as by hovering over or selecting a scorecard view. The scorecards may be presented as an illustration of the binary values of the final rankings and the reward value available may illustrate the tier levels of the pari-mutuel pool and the associated award rates for each award level.

The processor of the gaming machine may be configured to transform the listing of features obtained from the database into the performance profile for each participant, and the player may further expand the performance profile into the listings of the features obtained from the database by scrolling onto or selecting a participant in the event to launch said listing of features of that participant, or may collapse the performance profiles or the listings into an unlaunched state by scrolling away from or deselecting the listing or the snapshot. The player may thereby be exposed to varying and custom levels of listings based on the features of the participants of the events to inform a wager decision according to an individual player's desire for analyzing said features.

While the entertaining display changes depending on the tier level of the pari-mutuel pool and the result of the player's wager, the summary window can remain dedicated to illustrating the selected events. The illustration of the selected events may proceed from the creation of the performance profiles of the participants by the processor to the creation of an animation of the final ranking of the participants in the selected events, and then to a final result identifying the accuracy of each prediction of the player's wager which can similarly launch a listing of the final rankings of all of the participants in the event when selected.

The summary window of exemplary embodiments of the present disclosure advantageously provides a player with the desired level of familiarity with the participants of the selected events. The performance profiles of the participants are built on the underlying listing of features and can present a player with a snapshot of the participants in the event and/or the odds associated with the wager. By providing the performance profiles and the listings of features in an unlaunched state associated with the summary window, players can determine the level of familiarity that they wish to develop with each event prior to making their predictions and accordingly a level of skill they wish to apply. Because the summary window remains directed to the selected events throughout the game, players can always review their predictions and their accuracy relative to the actual final rankings.

The exemplary embodiments of the system and method for gaming enable a less complex, more easily controlled, and more entertaining experience for players by determining a reward value from a single pari-mutuel pool divided into progressive tier levels with varying award rates. Both an entertaining display and a summary window that displays limited features relating to the selected events, the scorecards and the pari-mutuel pool are generated in an interface, the events further being selectable to launch a performance profile of participants in the event and the performance profiles being selectable to launch a listing of underlying features.

The problems of static reward values and a lack of variety in available wagers are further addressed by creating varying award levels having different award rates for each tier level of a pari-mutuel pool, the award level corresponding to a scorecard including positive and negative selections.

These and other features of the disclosure will become better understood by reference to the following description, appended claims, and accompanying drawings.

BRIEF DESCRIPTION OF THE DRAWINGS

FIG. 7 illustrates a method for determining a reward value based on an award level and a total pool value according to an embodiment of the disclosure.

Figure 1:
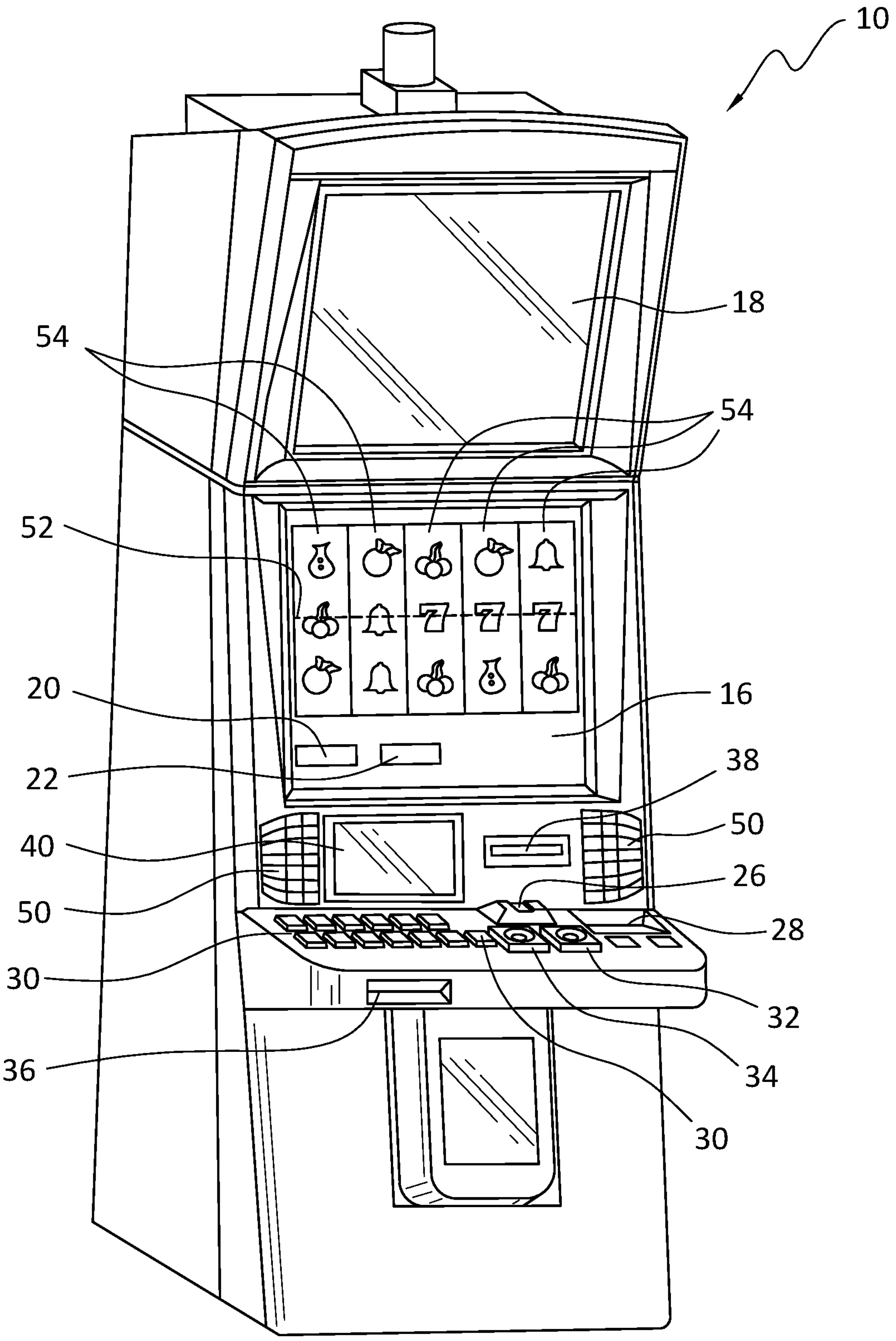
FIG. 1 is a perspective view of a gaming machine according to an embodiment of the present disclosure.

The figures are not necessarily drawn to scale, but instead are drawn to provide a better understanding of the components, and are not intended to be limiting in scope, but to provide exemplary illustrations. The figures illustrate exemplary configurations of a system and method for gaming, and in no way limit the structures, configurations, or methods of the system and method for gaming according to the present disclosure.

DETAILED DESCRIPTION OF VARIOUS EMBODIMENTS

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. The dimensions, angles, and curvatures represented in the figures introduced above are to be understood as exemplary and are not necessarily shown in proportion. It should be understood, however, there is no intention to limit the disclosure to the specific embodiments disclosed, but on the contrary, the intention covers all modifications, alternative constructions, combinations, and equivalents falling within the spirit and scope of the disclosure.

The flowchart illustrations and block diagrams in the flow diagrams illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart illustrations and/or block diagram block or blocks.

The disclosed embodiments relate to systems and methods for gaming that overcome the problems of static gameplay in existing gaming machines and provide an improved experience for players. The disclosure outlines some example improvements and practical applications provided by the disclosed embodiments. It will be appreciated, however, that these are just examples only and that the embodiments are not limited to only these improvements.

The embodiments may be implemented to overcome many of the technical difficulties and computational expenses associated with gaming, including obtaining and transforming data of one or more events which included multiple participants or variables, including features of the multiple participants and/or associated odds. The embodiments may provide a combined order of specified rules that render the data of the events and/or the features of the multiple participants into a specific format used to create varying reward values dependent on both an award level and a total pool value of a pari-mutuel pool, in an objective, quantitative way that overcomes the limitations of current methods for conducting, especially across multiple pools. By providing the system and method for gaming according to the embodiments, the defining rules and procedures for determining the reward values may be applied to multiple award levels and/or wagers in a single pari-mutuel pool, thereby providing improved variety and variability in gameplay.

The disclosed embodiments operate to improve how a gaming machine comprising a computing device operates and/or functions. For instance, the disclosed embodiments are able to automatically increase the variety and variability of reward values available for gaming by following the disclosed principles. Furthermore, the processing speed and operational efficiency of the gaming machine can be improved by dividing a single pari-mutuel pool into a plurality of tier levels, because the device is not required to maintain separate pools for different wager types or scorecards. As a consequence, the disclosed embodiments operate to improve the computing efficiency and resource utilization of a gaming machine and related computing architecture. As an additional example, by varying the entertaining display based on the tier level of the pari-mutuel pool and the result of the player's wager, the disclosed embodiments will also improve the presentation of the game to a player.

The disclosed embodiments may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment.

In one embodiment, the computerized instructions for controlling any games are executed by at least one central server, central controller, or remote host. In such a "thin client" embodiment, the central server remotely controls any games (or other suitable interfaces) and the gaming machine is utilized to display such games (or suitable interfaces) and receive one or more inputs or commands from a player. In another embodiment, the computerized instructions for controlling any games are communicated from the central server, central controller, or remote host to a gaming machine's local processor and memory devices. In such a "thick client" embodiment, the gaming machine's local processor executes the communicated computerized instructions to control any games (or other suitable interfaces) provided to a player.

Referring to FIG. 1, one embodiment of a gaming machine 10, according to an embodiment of the present disclosure, has a support structure, housing, or cabinet which provides support for a plurality of displays, inputs, controls, and other features of a conventional gaming machine. It is configured so that a player can operate it while standing or sitting. The gaming machine 10 can be positioned on a base or stand or can be configured as a pub-style table-top game (not shown) which a player can operate preferably while sitting. It should be appreciated that the gaming machine 10 may have varying cabinet and display configurations.

Figure 2A:
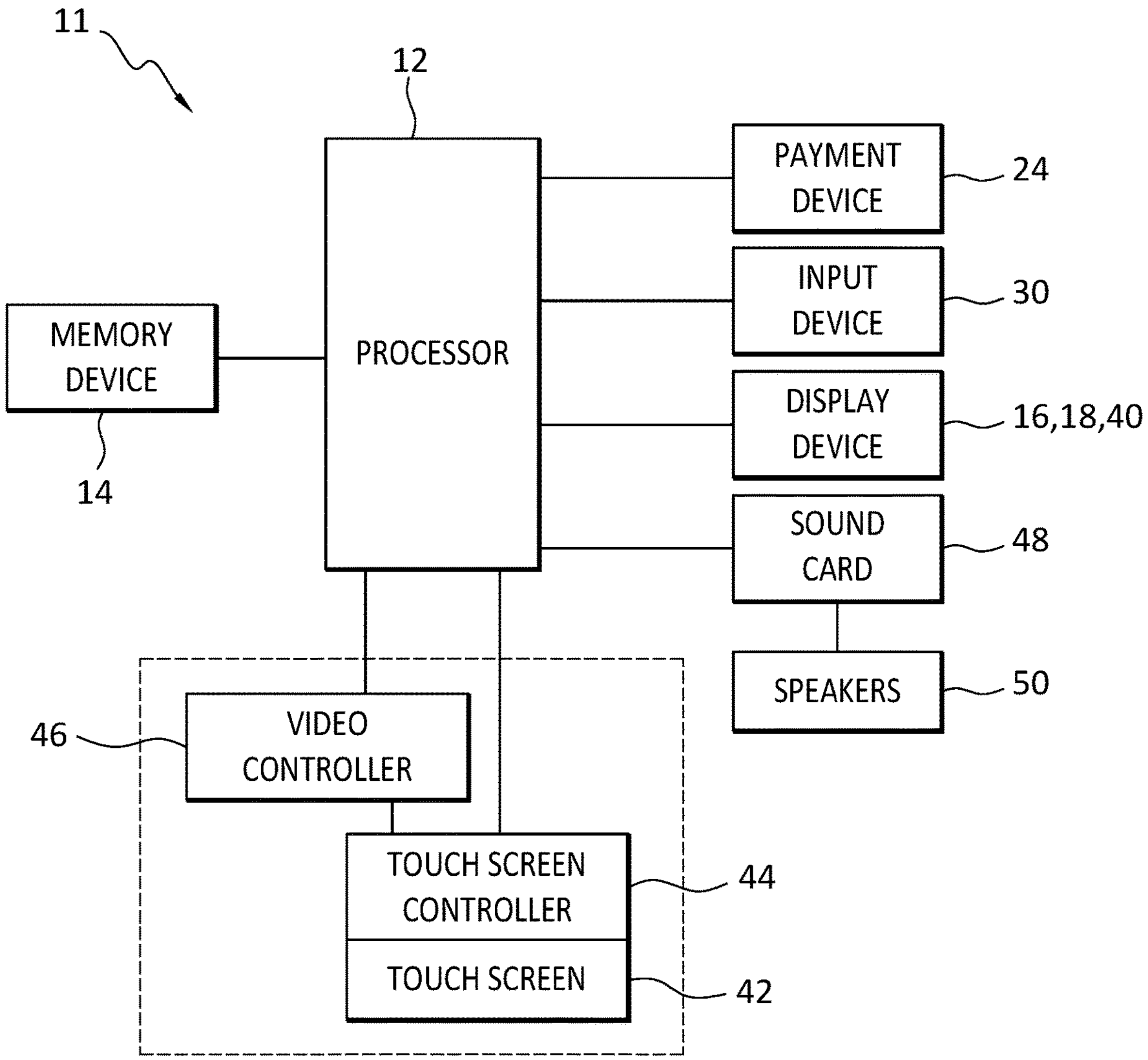
FIG. 2A is a diagrammatic view of an electronic system of a gaming machine according to an embodiment of the disclosure.

In one embodiment, as illustrated in FIG. 2A, an electronic system for facilitating gaming by a player according to the present disclosure is generally shown at 11. The electronic system 11 may be a separate gaming machine or used with the gaming machine 10 of FIG. 1. The electronic system 11 includes at least one processor 12, such as a microprocessor, a microcontroller-based platform, a suitable integrated circuit or one or more application-specific integrated circuits (ASIC's). The processor 12 is in communication with or operable to access or to exchange signals with at least one data storage or memory device 14.

In one embodiment, the processor 12 and the memory device 14 reside within the cabinet of the gaming machine 10. The memory device 14 stores program code and instructions, executable by the processor 12, to control the gaming machine 10. The memory device 14 also stores other data such as image data, event data, player input data, random or pseudo-random number generators, pay-table data or information, and applicable game rules that relate to the play of the casino game. In one embodiment, the memory device 14 includes random access memory (RAM), which can include non-volatile RAM (NVRAM), magnetic RAM (MRAM), ferroelectric RAM (FeRAM), and other forms as commonly understood in the gaming industry. In one embodiment, the memory device 14 includes read only memory (ROM). In one embodiment, the memory device 14 includes flash memory and/or EEPROM (electrically erasable programmable read only memory). It should be appreciated that, any other suitable magnetic, optical, and/or semiconductor memory may operate in conjunction with the electronic system 11.

In one embodiment, part or all of the program code and/or operating data described above can be stored in a detachable or removable memory device 14, including, but not limited to, a suitable cartridge, disk, CD ROM, DVD, or USB memory device. In other embodiments, part or all of the program code and/or operating data described above can be downloaded to the memory device 14 through a suitable network.

In one embodiment, an operator or a player can use such a removable memory device in a desktop computer, a laptop computer, a hand-held device, such as a personal digital assistant (PDA), a portable computing or mobile device, or another computerized platform to implement embodiments of the present disclosure. In one embodiment, the electronic system 11 is operable over a wireless network, for example as part of a wireless gaming machine. In one such embodiment, the electronic system 11 may be a hand-held device, a mobile device, or any other suitable wireless device that enables a player to play any suitable game at a variety of different locations.

In various embodiments in which the electronic system 11 is a hand-held device, a mobile device, or any other suitable wireless device, at least one memory device 14 and at least one processor 12 which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It should be appreciated that a gaming device or gaming machine as disclosed herein may be a device that has obtained approval from a regulatory gaming commission or a device that has not obtained approval from a regulatory gaming commission. It should be appreciated that the processor 12 and memory device 14 may be collectively referred to herein as a "computer," "computing device" or "controller."

In one embodiment, as illustrated in FIG. 2A, the electronic system 11 includes one or more display devices 16, 18, 40 controlled by the processor 12. The display devices 16, 18, 40 are preferably connected to or mounted on the cabinet of the gaming machine 10. The embodiment shown in FIG. 1 includes a central display device 16 which displays a primary or base game and an upper display device 18. The central display device 16 may also display any suitable secondary game associated with the primary or base game as well as information relating to the primary or secondary game. The upper display device 18 may display the primary game, any suitable secondary game associated or not associated with the primary game, and/or information relating to the primary or secondary game. These display devices 16, 18 may also serve as digital glass operable to advertise games or other aspects of the gaming establishment.

As seen in FIG. 1, in one embodiment, the gaming machine 10 includes a credit display 20 which displays a player's current number of credits, cash, account balance, or the equivalent. The gaming machine 10 may include a bet display 22 which displays a player's amount wagered. The gaming machine 10 may include a player tracking display 40 which displays information regarding a player's play status, such as including past wins, number of past wagers, etc. It should be appreciated that one or more of these display devices 16, 18, 20, 22, 40 is in communication with the processor 12.

In another embodiment, at least one display device may be a mobile display device, such as a PDA or tablet PC, that enables play of at least a portion of the primary or secondary game at a location remote from the gaming machine 10 or electronic system 11.

The display devices 16, 18, 40 may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display devices 16, 18, 40 include a touch-screen with an associated touch-screen controller. The display devices 16, 18, 40 may be of any suitable size and configuration, such as a square, a rectangle or an elongated rectangle.

The display devices 16, 18, 40 of the gaming machine 10 are configured to display at least one and preferably a plurality of games or other suitable images, symbols and indicia such as any visual representation or exhibition of the movement of objects such as mechanical, virtual, or video reels and wheels, etc., and the like.

In one embodiment, the symbols, images and indicia displayed on or of the display device may be in mechanical form. That is, the display devices 16, 18, 40 may include any electromechanical device, such as one or more mechanical objects. An example of an exemplary electromechanical device according to embodiments of the disclosure may include one or more rotatable wheels or reels configured to display at least one or a plurality of games or other suitable images, symbols or indicia.

As illustrated in FIG. 2A, the electronic system 11 may include at least one payment device 24 in communication with the processor 12. The payment device 24 may be a payment acceptor including a note, ticket or bill acceptor 28 (FIG. 1) wherein the player inserts paper money, a ticket, or voucher, and/or a coin slot 26 (FIG. 1) where the player inserts money, coins, or tokens. In other embodiments, other payment devices 24 such as readers or validators for credit cards, debit cards or credit slips may accept payment. A player may insert an identification card into a card reader 24 of the gaming machine 10.

The identification card may be a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming machine 10. In one embodiment, money may be transferred by a player to a gaming machine 10 through electronic funds transfer. It should be appreciated that, when a player funds the gaming machine 10, the processor 12 determines the amount of funds entered and displays the corresponding amount on the credit or other suitable display as described previously.

As seen in FIGS. 1 and 2A, in one embodiment the gaming machine 10 and electronic system 11 includes at least one input device 30 in communication with the processor 12. The at least one input device 30 can include any suitable device which enables the player to produce an input signal which is received by the processor 12. In one embodiment, after appropriate funding of the gaming machine 10, the input device 30 is a game-activation device, such as a play button 32 or a pull arm (not shown) which is used by the player to start any primary or base game or sequence of events in the gaming machine 10. The play button 32 can be any suitable play activator such as a bet-one button, a max-bet button, or a repeat-the-bet button. In one embodiment, upon appropriate funding, the gaming machine 10 begins the game play automatically. In another embodiment, upon the player engaging one of the play buttons 32, the gaming machine 10 automatically activates game play.

In one embodiment, one input device is a bet one button. The player places a bet by pushing the bet-one button 32. The player can increase the bet by one credit each time the player pushes the bet-one button 32. When the player pushes the bet-one button 32, the number of credits shown in the credit display 20 preferably decreases by one, and the number of credits shown in the bet display preferably increases by one. In another embodiment, one input device 30 is a bet-max button (not shown) which enables the player to bet the maximum wager permitted for a game of the gaming machine 10.

In one embodiment, one input device is a cash out button 34. The player may push the cash out button 34 and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system).

In another embodiment, when the player cashes out, the player receives the coins or tokens in a coin payout tray. In one embodiment, the gaming machine 10 includes at least one card reader 38 in communication with the processor 12. In this embodiment, a player is issued a player identification card which has an encoded player identification number that uniquely identifies the player. When the player inserts their playing tracking card into the card reader 38 to begin a gaming session, the card reader 38 reads the player identification number off the player tracking card to identify the player. It should be appreciated that any suitable payout mechanism, such as funding to the player's electronically recordable identification card or smart card, may be implemented in accordance with the gaming machine 10.

In one embodiment, as mentioned above and as seen in FIG. 2A, one input device is a touch-screen 42 coupled with a touch-screen controller 44 or some other touch-sensitive display overlay to allow for player interaction with the images on the touch screen 42. The touch-screen 42 and the touch-screen controller 44 are connected to a video controller 46. A player can make decisions and input signals into the gaming machine 10 or the electronic system 11 by touching the touch-screen 42 at the appropriate locations. One such input device is a conventional touch-screen button panel.

The electronic system 11 may further include a plurality of communication ports for enabling communication of the processor with external peripherals, such as external video sources, expansion buses, game or other displays, a SCSI port, or a keypad.

In one embodiment, as seen in FIG. 2A, the electronic system 11 includes a sound generating device controlled by one or more sounds cards 48 which function in conjunction with the processor 12. In one embodiment, the sound-generating device includes at least one and preferably a plurality of speakers 50 or other sound-generating hardware and/or software for generating sounds. The sound-generating device may, for example, play music for the primary and/or secondary game or play music for other modes of the gaming machine 10, such as an attract mode.

In one embodiment, the gaming machine 10 provides dynamic sounds coupled with attractive multimedia images displayed on one or more of the display devices 16, 18, 40 to provide an audio-visual representation or to otherwise display full-motion video with sound to attract players to the gaming machine 10. During idle periods, the gaming machine 10 may display a sequence of audio and/or visual attraction messages to attract potential players to the gaming machine 10. The videos may also be customized to provide any appropriate information.

In one embodiment, the gaming machine 10 may include a sensor, such as a camera, in communication with the processor 12 (and possibly controlled by the processor 12), that is selectively positioned to acquire an image of a player actively using the gaming machine 10 and/or the surrounding area of the gaming machine 10. In one embodiment, the camera may be configured to selectively acquire still or moving (e.g., video) images and may be configured to acquire the images in an analog, digital, or other suitable format. The display devices 16, 18, 40 may be configured to display the image acquired by the camera as well as to display the visual features of the game in split screen or picture-in-picture fashion. For example, the camera may acquire an image of the player and the processor may incorporate that image into the primary and/or secondary game as a game image, symbol or indicia.

The gaming machine 10 can incorporate any suitable wagering game as the primary or base game. The gaming machine 10 may include some or all of the features of conventional gaming machines or devices.

In one embodiment, as illustrated in FIG. 1, a base or primary game may include an entertaining display with one or more paylines 52. The paylines 52 may be horizontal, vertical, circular, diagonal, angled or any combination thereof. In this embodiment, the gaming machine 10 includes at least one and preferably a plurality of reels 54, such as three to five reels 54, in either electromechanical form with mechanical rotating reels or video form with simulated reels and movement thereof.

In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming machine 10.

In another embodiment, one or more of the reels 54 are independent reels or unisymbol reels. In this embodiment, each independent or unisymbol reel generates and displays one symbol to the player. The gaming machine 10 may control the reels 54 of the entertaining display to stop spinning in an arrangement corresponding to a result of the player's wager.

In one embodiment, in addition to winning credits or other awards in a base or primary game, the gaming machine 10 may also give players the opportunity to win credits in a bonus or secondary game or in a bonus or secondary round simultaneously or subsequently. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game is similar to the base or primary game.

Figure 2B:
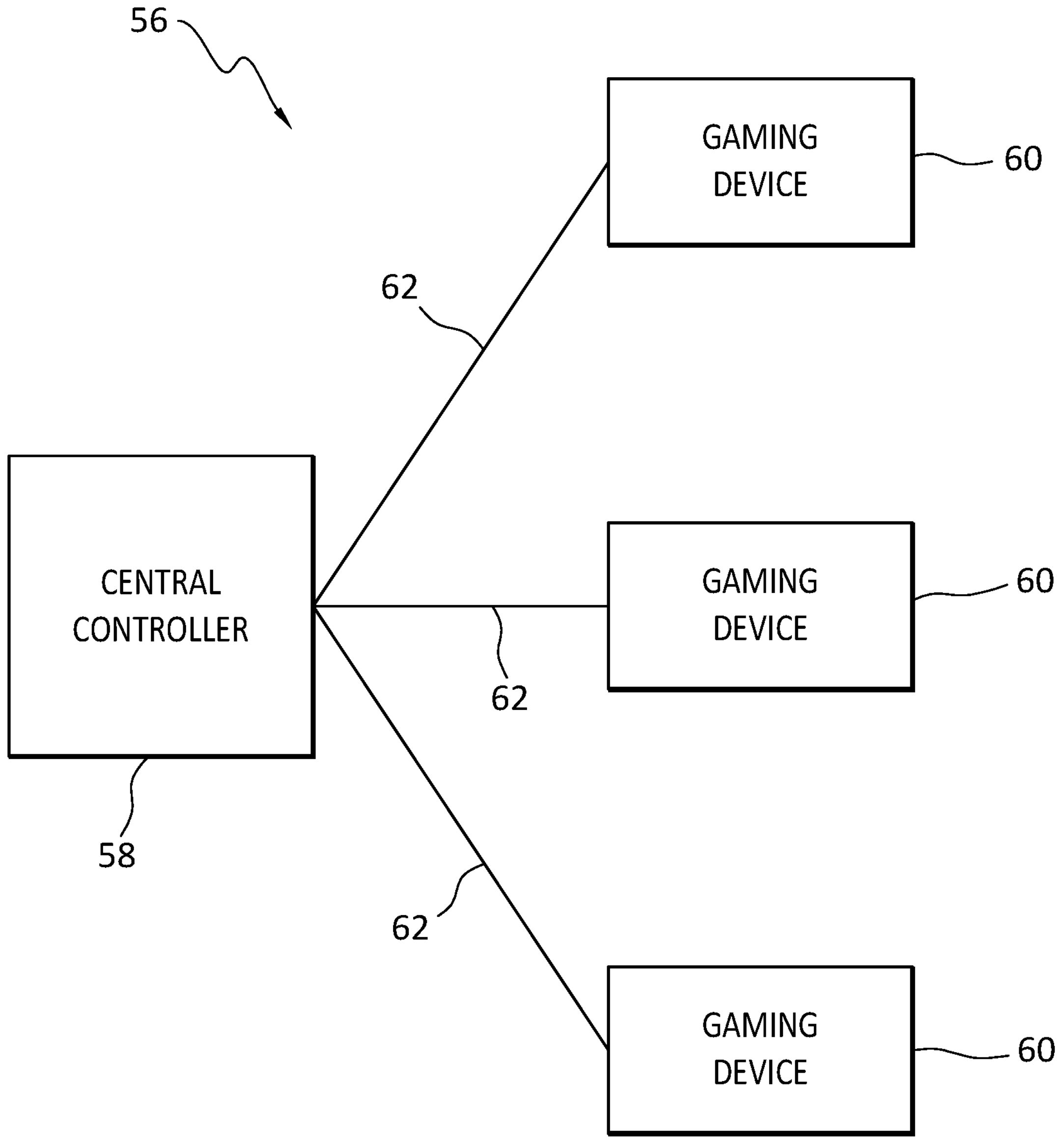
FIG. 2B is a diagrammatic view of a gaming system according to an embodiment of the disclosure.

In one embodiment, as illustrated in FIG. 2B, a gaming system according to the present disclosure is generally shown at 56. The gaming system 56 includes at least one central controller 58 and one or more gaming controllers or devices 60 in communication with each other and/or the at least one central controller 58 through a data network or remote communication link 62. In this embodiment, the central server, central controller, central computer, or remote host is any suitable server or computing device which includes at least one processor and at least one memory or storage device. In different such embodiments, the central server is a progressive controller or a processor of one of the gaming machines in the gaming system.

In these embodiments, the processor of each gaming machine is designed to transmit and receive events, messages, commands, or any other suitable data or signal between the individual gaming machine and the central server. The gaming machine processor is operable to execute such communicated events, messages, or commands in conjunction with the operation of the gaming machine. Moreover, the processor of the central server is designed to transmit and receive events, messages, commands, or any other suitable data or signal between the central server and each of the individual gaming machines. The central server processor is operable to execute such communicated events, messages, or commands in conjunction with the operation of the central server. It should be appreciated that one, more or each of the functions of the central controller, central server or remote host as disclosed herein may be performed by one or more gaming machine processors. It should be further appreciated that one, more or each of the functions of one or more gaming machine processors as disclosed herein may be performed by the central controller, central server or remote host.

In one embodiment, a plurality of the gaming machines 60 are capable of being connected together through a data network. In one embodiment, the data network is a local area network (LAN), in which one or more of the gaming machines 60 are substantially proximate to each other and an on-site central server or controller as in, for example, a gaming establishment or a portion of a gaming establishment. In another embodiment, the data network is a wide area network (WAN) in which one or more of the gaming machines are in communication with at least one off-site central server or controller. In this embodiment, the plurality of gaming machines 60 may be located in a different part of the gaming establishment or within a different gaming establishment than the off-site central server or controller. Thus, the WAN may include an off-site central server or controller and an off-site gaming machine located within gaming establishments in the same geographic area, such as a city or state. The WAN gaming system may be substantially identical to the LAN gaming system described above, although the number of gaming machines in each system may vary relative to one another.

In another embodiment, the data network 62 is an internet or intranet. In this embodiment, the operation of the gaming machine 60 may be viewed at the gaming machine 60 using at least one internet browser implemented thereon. In this embodiment, operation of the gaming machine 60 and accumulation of credits may be accomplished with only a connection to the central server or controller 58 (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, embodiments may be employed in a server-based gaming system. In one such embodiment, as described above, one or more gaming machines 60 are in communication with a central server or controller 58. The central server or controller 58 may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming machine processor, to control the gaming machine. Each executable game program represents a different game or type of game which may be played on one or more of the gaming machines in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming machine) or vice versa.

In this embodiment, each gaming machine 60 at least includes one or more display devices and/or one or more input devices for interaction with a player. A local processor, such as the above-described gaming machine processor or a processor of a local server, is operable with the display device(s) and/or the input device(s) of one or more of the gaming machines.

In operation, the central controller 58 is operable to communicate one or more of the stored game programs to at least one local processor. In different embodiments, the stored game programs are communicated or delivered by embedding the communicated game program in a device or a component (e.g., a microchip to be inserted in a gaming machine), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming machine. That is, when a game program is communicated to a local processor, the local processor changes the game or type of game played at the gaming machine.

Several (or different) elements discussed below, and/or claimed, are described as being “coupled”, “in communication with”, or “configured to be in communication with”. This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

The methodologies described herein may be implemented by various means depending upon applications according to particular examples. For example, such methodologies may be implemented in hardware, firmware, software, or combinations thereof. In a hardware implementation, for example, the controller or processing unit may be implemented within one or more application specific integrated circuits (“ASICs”), digital signal processors (“DSPs”), digital signal processing devices (“DSPDs”), programmable logic devices (“PLDs”), field programmable gate arrays (“FPGAs”), processors, controllers, micro-controllers, microprocessors, electronic devices, other devices units designed to perform the functions described herein, or combinations thereof.

Some portions of the description included herein are presented in terms of algorithms or symbolic representations of operations on binary digital signals stored within a memory of a specific apparatus or special purpose computing device or platform. In the context of this particular specification, a specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be appreciated, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this description, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

For clarity in discussing the various functions of the system, multiple computers and/or servers are discussed as performing different functions. These different computers (or servers) may, however, be implemented in multiple different ways such as modules within a single computer, as nodes of a computer system, etc. The functions performed by the system (or nodes or modules) may be centralized or distributed in any suitable manner across the system and its components, regardless of the location of specific hardware. Furthermore, specific components of the system may be referenced using functional terminology in their names. The function terminology is used solely for purposes of naming convention and to distinguish one element from another in the following discussion. Unless otherwise specified, the name of an element conveys no specific functionality to the element or component. It should be appreciated that, in selected embodiments, the software, hardware, and associated components of the system may be programmed and configured to implement one or more embodiments described herein. It should also be appreciated that the various aspects of the system may be exemplified as software, modules, nodes, etc. of a computer or server.

Embodiments of the current disclosure may include a gaming machine or system configured to facilitate wagering on events concurrently. The central controller or server 58 of the system may include databases, terminals, and computing devices to manage one or more common betting pools in a pari-mutuel wagering environment. The central controller 58 may include a totalizer for accepting and processing wagers of a plurality of players, making pool allocations, calculating odds and prices of wagers, calculating the commission for the operator, and distributing winnings. Rewards may be distributed to players based on scorecards including positive and negative picks that are associated with a wagering pool of the totalizer. The central controller 58 may maintain separate math models and separate pari-mutuel wagering pools for different denominations and wager levels offered by each model.

Figure 3:
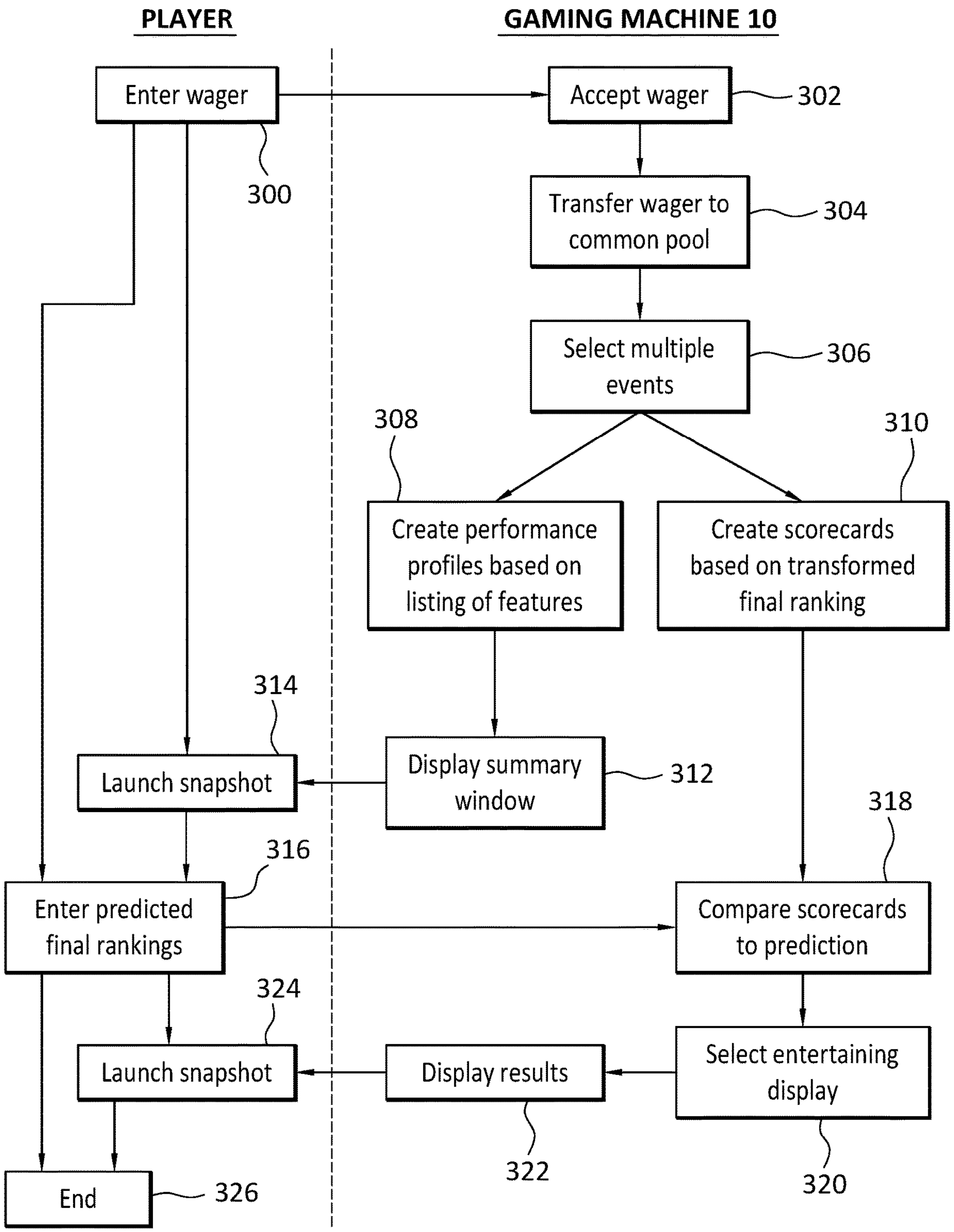
FIG. 3 is a flowchart of one embodiment of a method of operating a gaming machine according to the present disclosure.

According to an embodiment of the current disclosure, the gaming machine 10 is configured to facilitate wagering on events by a player as illustrated in the flowchart illustration of FIG. 3.

The player initiates the game on the gaming machine 10 and may place a wager 300 by any suitable method, such as described previously by transferring money to the gaming machine 10. At least one or a plurality of input devices 30 may be used to facilitate the wager and the gaming machine 10 accepts the wager 302.

The wager is transferred 304 to a common pool associated with the wager level of the wager provided by the player. The step of transferring the wager 304 to a common pool may include transferring the wager to a central controller 58. The central controller 58 may include a totalizer for allocating or managing wagers among common pools in accordance with a pari-mutuel gaming system.

The gaming machine 10 controls the processor to communicate with an event database for selecting multiple events 306 and the associated final rankings of the participants together with listings of features of the participants. The event database may be located in a remote server, in the memory of the gaming machine 10 or in another suitable location. According to an embodiment of the current disclosure, the processor of the gaming machine may be configured to select multiple events randomly or may select multiple events based on a predetermined data filter. The multiple events may include at least two events, at least three events, at least four events, at least five events, at least six events or may preferably include eight events. The aforementioned numbers of events are merely exemplary and any number of events may be included.

A predetermined data filter according to the current disclosure may be arranged for selecting multiple events according to the specific regulations of the gaming jurisdiction wherein the gaming machine 10 is located. These regulations typically prescribe limitations on the data which can be used, such as on the race data available for use in HHR gaming machines. As such, any and all HHR data included in such gaming machines must be constructed and filtered such that the selection of each event complies with these types of regulatory requirements.

Starting from raw HHR data, or other event data, a series of filters may be applied in a predetermined sequence to efficiently create sets of event data for a given jurisdiction or regulatory framework. Examples of filters which may be applied, but are not required, may include: excluding events having venues in certain geographic locations, excluding events by type of event or participant (e.g. event rules, participant age, participant gender, participant breed, etc.), excluding events having fewer than a minimum number of participants, excluding events having more than a maximum number of participants, excluding events having one or more disqualified or scratched participants, excluding events with one or more participant that did not complete the event, excluding events where multiple participants were assigned/awarded the same final ranking, excluding events having entries with non-integer program numbers, excluding events for which program numbers do not run consecutively from 1-N(where N is the number of runners in the race), excluding events for which final rankings do not run consecutively from 1-N.

It will be understood that the list of the above filters is merely exemplary, and the filters may be rearranged, added to, included or excluded, and otherwise modified within the spirit and scope of the disclosure.

The predetermined data filter may be established based on the jurisdiction in which the gaming machine 10 is intended to be located, or the gaming machine 10 may include a location module for detecting the location of the gaming machine 10. In an embodiment wherein the gaming machine 10 includes a location module, such as for determining the location of the gaming machine 10 using GPS information, an IP address, etc., the gaming machine 10 may select a data filter automatically based on the location of the gaming machine 10.

The data about the selected events may include a final ranking for the multiple participants of each event, the final ranking for the respective participants in each event determined by the finishing position in the field and ranking the participants with respect to other participants who competed in the same event. Other ranking systems may be used, such as rankings based on both subjective or objective performance metrics that are assigned by the rules of a sport, a judge, or a panel of judges.

At 310 the processor of the gaming machine 10 or the central controller may transform the final rankings of the selected events to limit the number of participants (e.g. horses of a historical horse-racing event) that are considered and define a scorecard. The transformed final ranking of fewer than the total number of participants may include only the participants that finish first, second and third for each event, where each event includes more than three participants.

By considering the final ranking of less than the total number of participants a greater number of events are available for gaming relative to existing gaming systems where only events having the same number of participants are permitted. Embodiments of the current disclosure may use events having differing numbers of participants and thereby the variability and variety of scorecards available for gaming is increased, the processing speed is increased and the processing load is reduced. For example, where the number of participants is varied due to participants that did not finish an event due to disqualification, forfeit, etc., a final ranking considering less than the total number of participants allows the use of the event for gaming with other events where the number of participants may be greater or smaller. Further, the use of events comprising different types of races, sporting events, etc. where the number of participants may vary is enabled, providing the ability to create novel combinations of different events for wagering, thereby improving player satisfaction and increasing player interest.

To define a scorecard according to embodiments of the current disclosure, the processor may consider both negative and positive predictions. A reward may be tied to predicting the results of two events where the user must select the first, second and third finishers correctly in the first event but also incorrectly select the first, second and third finishers in the second event. Given these two events and the corresponding reward, the gaming machine may create a binary scorecard assigning a (1) for a positive or correct selection and a (0) for a negative or incorrect selection such that the scorecard reads (111000) for the two events.

Additional scorecards may include the correct selection of the first finisher and the incorrect selection of the second and third finishers for each race (100100), the correct selection of the second finisher and the incorrect selection of the first and third finishers for each race (010010), and the correct selection of the third finisher and the incorrect selection of the first and third second finishers for each race (001001). Additional combinations may be employed covering any number of combinations, e.g. (101010), (100010), (001110), etc., such as would be understood from the present disclosure by one skilled in the art. The use of scorecards with different combinations of positive and negative selections for comparison to the selection of the user increases the difficulty of cheating and the variability of wagers available, as the user must pick both the correct finishers and incorrect finishers.

Variations in the scorecard with different combinations of positive and negative selections within the selected events may be tied to different award levels within a single pari-mutuel pool controlled by the totalizer and/or the central controller 58.

At 308 the processor 12 may create performance profiles for each participant in the selected events based on the listings of features of the participants. The listings of features of the participants may include physical characteristics of a participant, historical performances of a participant in different distances, different environmental conditions, odds, and other conditions. In some embodiments, the processor may create performance profiles for each participant based on all of the events provided in the database by searching the database for all previous events and computing a single-value score which incorporates all such past performance data.

According to some embodiments the participant may be a racehorse and the listings of features may include characteristics of the race horse, a jockey riding the horse, and a trainer affiliated with the race horse and/or jockey such as is generally provided to players at a racetrack in a daily racing form or horse racing form. Within these embodiments, it may be possible for the processor to search a historical horse-race database for all previous race results for each horse, jockey, and trainer in the database, given the date for a specific race; and compute a single-value score which incorporates all such past performance data.

In one example, the processor may, for each combination of [Horse|Jockey|Trainer] [H|J|T] in a historical horse race (HHR) database, find all race-entries of which that [H|J|T] was a member and sort such race-entries by date-of-race (ascending). For each race-entry identified, the processor may iterate through such race-entries in ascending date-sorted order and accumulate a past-performance record with each iteration. Thus, on iteration N, the accumulated past-performance record of the [H|J|T] under consideration is based on the N-1 prior races/iterations. For a given race-date, race performance from races which occurred on the same date may be excluded as it may not be possible to determine which same-day race occurred first.

For each race-entry identified and relevant data accumulated in the past-performance record, the processor may sum up prior starts, prior $1^{st}$ place finishes, prior $2^{nd}$ place finishes, prior $3^{rd}$ place finishes, and prior in-the-money (ITM) finishes (generally defined as finishing in either $1^{st}$ place, $2^{nd}$ place, or $3^{rd}$ place). From these sums, the processor computes a base score of [H|J|T], defined as 100*(Number of prior ITM finishes)/(Number of prior starts), with a minimum score of 0.0 and maximum possible score of 100.0.

To account for [H|J|T] where only a small amount of prior race performance data is available, the processor may apply a scaling factor to the base score. For example, where a smaller number of starts is available the base score may be multiplied by a scaling factor of less than 1. Multiple scaling factors may be employed, such that as the number of starts available decreases the base score is multiplied by a scaling factor with a corresponding decrease from 1.

Additional Win Factor scaling may be applied to the scaled score to account for the number of prior $1^{st}$ place finishes relative to the number of prior ITM finishes. For example, as the number of prior $1^{st}$ place finishes relative to the number of prior ITM finishes decreases the base score may be multiplied by a Win Factor of less than 1. Multiple Win Factors may be employed, such that as the number of prior $1^{st}$ place finishes relative to the number of prior ITM finishes decreases the base score is multiplied by a Win Factor with a corresponding decrease from 1.

The single-value score created by the processor is preferably transformed into a graphical representation such as a bar graph or similar graphic demonstrating the score for the participant, including the horse, jockey and trainer, comprising the performance profile of the participant. It will be understood that the disclosed embodiments of HHR games are merely exemplary, and that features of the present disclosure may also extend to other historical games and events, live horse-racing events and other live games, and the like.

Figure 4:
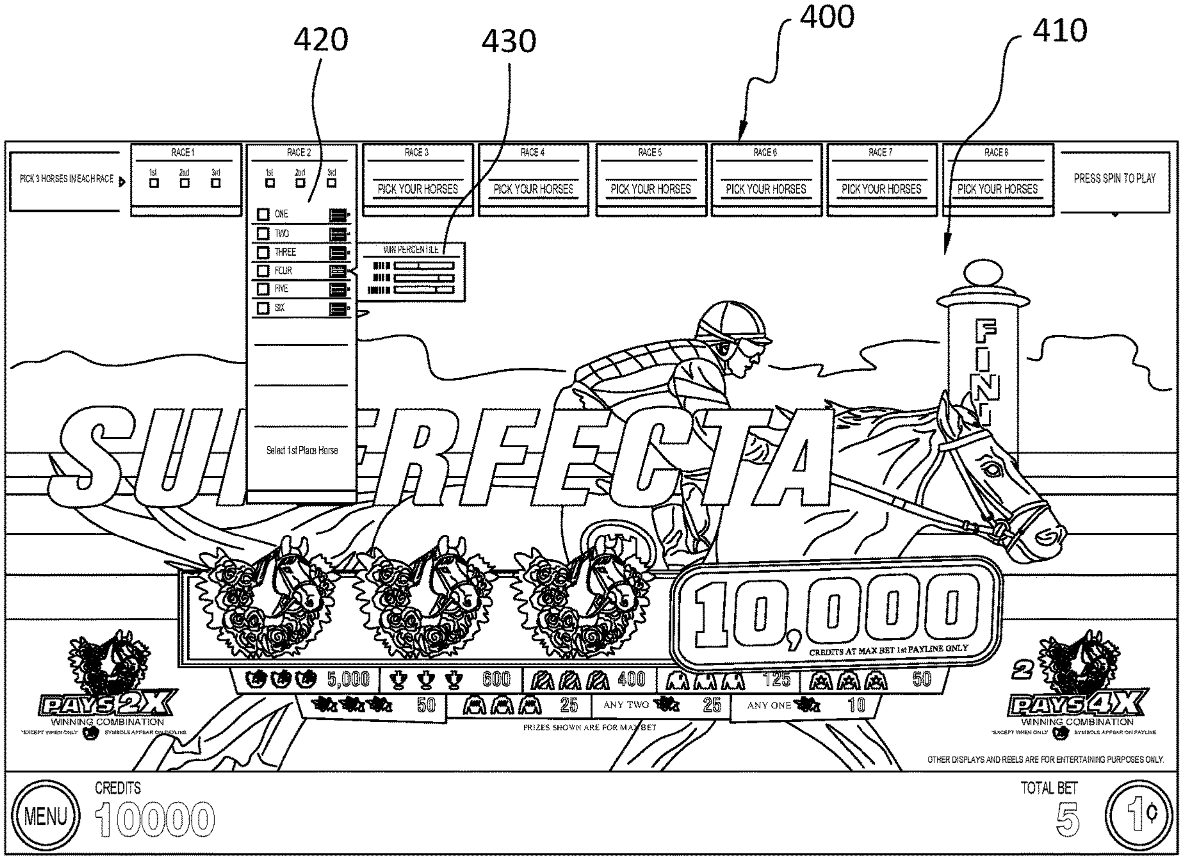
FIG. 4 illustrates a user interface including a summary window and an entertaining display for presenting output and accepting input prior to completing a wager according to an embodiment of the disclosure.

The performance profiles of the participants created by the processor are tied to a summary window 400 within an interface of the gaming machine 10 as shown in FIG. 4. As illustrated, the interface may include both the summary window 400 and an entertaining display 410, such that each of the summary window 400 and entertaining display 410 are provided with a dedicated space and are scaled to fit therein. This arrangement advantageously allows a player to engage with a particular game or functionality on the gaming machine 10 without precluding the concurrent playing of additional games or use of additional functionalities.

In an initial state of the interface, the summary window 400 may present a limited view of each event. When a player selects or scrolls over an event in the summary window 400, a snapshot 420 is launched 314 wherein the player is provided with the performance profiles of each participant in the event. Selecting or scrolling over an individual participant may launch an additional snapshot 430 showing a more detailed performance profile and/or the listing of features associated with the participant.

Figure 8:
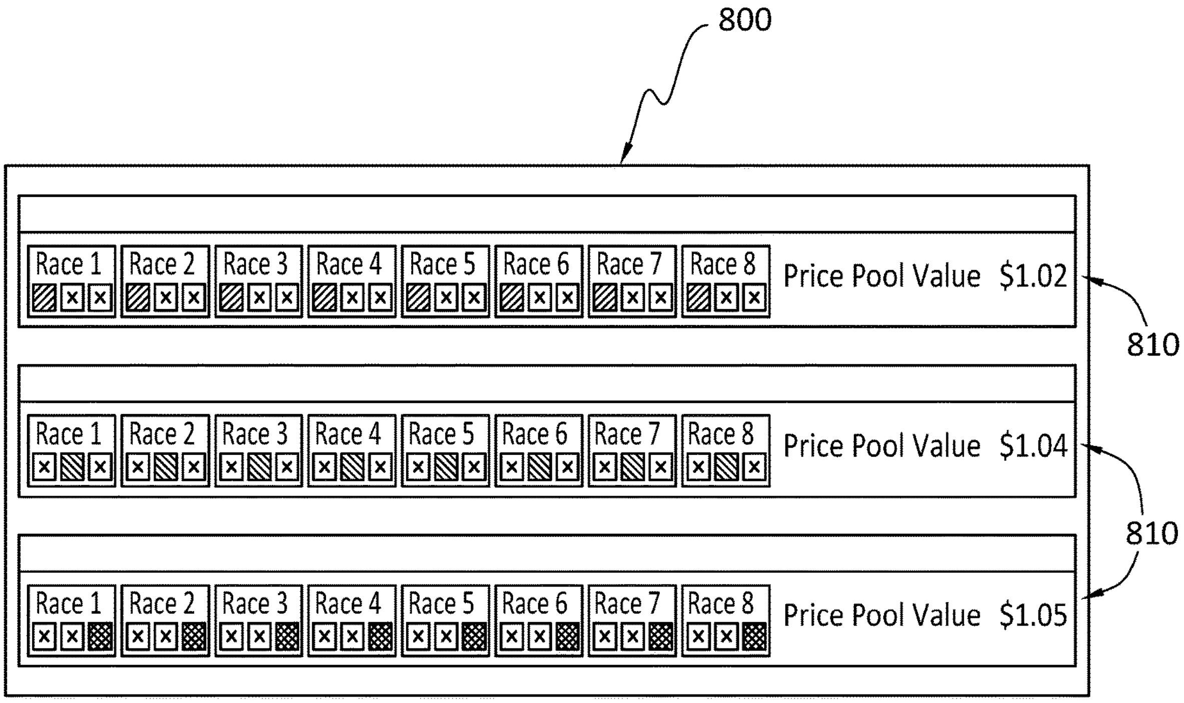
FIG. 8 illustrates a user interface including a payout snapshot displaying available scorecards according to an embodiment of the disclosure.

A payout snapshot 800 may be accessible by selecting or scrolling over a wager information icon, as illustrated in FIG. 8. The payout snapshot 800 may present the scorecards 810 available for a wager level, as well as the associated reward values based on a current value of the pari-mutuel pool. This information allows a player to employ a strategic element to their wager and allows the player to review the varying rewards available for a given scorecard, with the information presented on-demand in an easy to understand format according to the current disclosure. For example, a scorecard may be presented requiring the player to pick the winner of each of the events correctly while incorrectly picking a number of remaining positions. Alternatively, the player may attempt to match a prediction to a scorecard with correctly picking the third-place finisher in each event and incorrectly picking a number of remaining positions. All possible combinations of correct and incorrect picks may be provided as scorecards, with rewards varying according to the odds, difficulty, or based on another factor as would be understood from the current disclosure by one skilled in the art.

From the summary window 400, a player may create a predicted final ranking 316 based on the desired reward and the associated scorecard. The predictions for each event, or a need for said predictions, are shown in the summary window 400 and may be launched again by selecting or scrolling over the event.

According to the current disclosure there is the possibility for the player to select an auto-select or auto-fill option, wherein the processor automatically creates a predicted final ranking 316 based on a randomized selection, the performance profiles for each participant, or some combination thereof. In contrast to existing systems which restrict the player to only one of manual or automatic handicapping, the auto-select or auto-fill option according to the present disclosure may be used in combination with a manual selection, such that the player creates a partial predicted final ranking prior to selecting the auto-select or auto-fill option to automatically complete the predicted final ranking 316.

Although the term 'window' has been used to describe a drop-down summary, the summary does not have to be presented within any kind of frame. Any manner of presenting the common functions offered within the launched snapshot 420 and/or data stored in that snapshot 420 will constitute a 'window' as such or an equivalent.

The predicted rankings may be submitted to the processor for comparison to the scorecards of the gaming machine 318. In further embodiments, the scorecards may be provided in a pay table wherein the pay table identifies which scorecards are available for comparison to the predicted rankings based on the wager level provided by the player. If there is an available scorecard that is an exact match with the predicted rankings provided by the player, including both positive and negative selections, the final result is communicated to the totalizer or the central controller 58 to determine the reward associated with the scorecard, based on the value of the common pool at the totalizer.

The totalizer or the central controller 58 is arranged to dynamically determine the reward value associated with the scorecard based on an award level of the scorecard. In an example illustrated in FIG. 7, the central controller divides the total pool value into a plurality of tier levels 752 having predetermined values 750. The tier levels 752 may be filled progressively as value is added to the pari-mutuel pool, such that a first tier is filled prior to filling a second tier.

According to the example of FIG. 7, a pool value of 55,555, for example 55,555 dollars, points or another value representation, may break down into 5 tiers with tier 1=807; tier 2=23409; tier 3=26745; tier 4=4594; and tier 5=0. In some embodiments, the tier levels 752 may be selected with each tier level having a different size, such as a decreasing size at higher tier levels. A decreasing size at higher tier levels allows higher variability in the number of tier levels 752 filled as the total pool increases, incentivizing variability in gameplay as the stakes and number of players increase. Alternatively, the tier levels 752 may have an increasing size at higher tier levels, causing more variability at low total pool values in order to incentivize more wagers and more quickly grow the pool.

In the step of determining the reward value 760, each scorecard is associated with an award level 770 having a minimum award value 772 and a plurality of award rates 780 corresponding to each of the tier levels 752, such that the marginal rate of a reward varies as the total pool value increases or decreases. When the prediction of the final ranking input by a player matches a scorecard, the central controller identifies the award level 770 of the scorecard and identifies the plurality of award rates 780 associated with the award level, the plurality of award rates 780 corresponding with the plurality of tier levels 752.

The reward value for the matched scorecard comprises the minimum award value 772 of the award level 770 and a plurality of tier level values determined by applying the plurality of award rates 780 of the award level 770 to each of the corresponding tier levels 752. The reward value may be described as equal to (Min Award)+$\Sigma_{N=1}^{MaxTierNumber}$ (ValueOfTierN)* (AwardsRateOfTierN).

In the example of FIG. 7, a scorecard having an award level 770 equal to AWARD 8 may be determined as =(250)+(807)*(0)+(23409)*(0.011)+(26745)*(0.015)+(4594)*(0)+(0)*(0.018)=908. It will be understood that the example of FIG. 7 is merely exemplary, and the minimum awards, award rates, tier levels and award levels may be rearranged, added to, included or excluded, and otherwise modified within the spirit and scope of the disclosure.

Rather than using a static rate for determining reward values associated with a given outcome as the pool value increases or decreases as implemented in existing gaming machines, the dynamic determination of the reward value according to the present disclosure allows for changes in a marginal rate for each award level based on the total pool value by dividing the total pool value into tier levels having predetermined values. The dynamic determination of the reward value advantageously introduces new variation into gameplay without increasing processing requirements, and can increase player engagement, enjoyment and participation. In like manner, the dynamic determination of the reward values increases the control of a provider over the pool values, such that automatic variations in reward values can be implemented to increase player engagement and maintain necessary pool reserves.

By varying the award rates for the scorecards, or award levels 752, as the total pool value increases a player is continuously presented with changing gameplay reflective of the wagers of other players that pay into the pari-mutuel pool. The varying award rates 780 of the award levels 770 can increase the relative value of different scorecards and motivate the player to change the objective of their wager, such as from picking the final ranking correctly to picking the final ranking incorrectly, depending on the total pool value and the associated tier levels 752. Accordingly a user's engagement and enjoyment are increased, leading to increased participation in gaming and additional wagers.

The use of the tier levels also enables the gaming system to use a single pari-mutuel pool for the plurality of award levels rather than forming a plurality of pools associated with each award level or scorecard. In existing systems varying award rates are only accomplished by creating multiple pools but these pools are independent and a wager may only be applied to a single pool, resulting in slower, static growth of the pool values across a variety of wagers and a less dynamic system. Slower, static growth reduces the number of viable wager types and restricts the variability of gameplay available to players. Further, the use of a single pari-mutuel pool for the plurality of award levels rather than forming a plurality of pools associated with each award level or scorecard reduces processing requirements of associated systems and reduces the complexity and likelihood of errors in processing.

According to the present disclosure, a player may also be enabled to place multiple wagers on the same event or set of events using the same pari-mutuel pool. Multiple wagers may correspond to different scorecards, or award levels 770, allowing for further variation in gameplay using the same event or set of events and reducing the amount of event data required to maintain the gaming system. The use of multiple wagers on the same event or set of events with a single pari-mutuel pool further provides advantages in certain regulatory schemes, such as by decreasing tax burdens on players.

The processor then creates and/or selects an entertaining display 410 corresponding to the final result of the player's wager 320, based on whether a scorecard is found that is an exact match to the predicted rankings, which scorecard was an exact match, and/or the reward value won from the common pool. The entertaining display 410 created may break the value won from the common pool into multiple animations or bonus games. Breaking the value won into multiple animations or bonus games can increase the enjoyment and successful feeling of the player and encourage continued gaming.

Prior to the creation and/or selection of an entertaining display corresponding to the final result of the player's wager, the entertaining display may be determined based on the total pool value, such as based on the number of tier levels that are filled.

In some embodiments, the entertaining display 410 may include a separate component (not shown), such as a separate display screen or mechanical wheel separate from the summary window 400. The separate component may be mounted to the gaming machine in a region above the summary window 400 in order to increase visibility and presents the result of the player's wager in an entertaining manner that is visible to the player and surrounding individuals. The separate components may include a video display or a mechanical wheel provided with areas corresponding to a plurality of possible results of the player's wager. The mechanical wheel may be configured to rotate during the player's wager and be controlled by the processor of the gaming machine to align the resulting display of the wheel with the final result of the player's wager.

Figure 5:
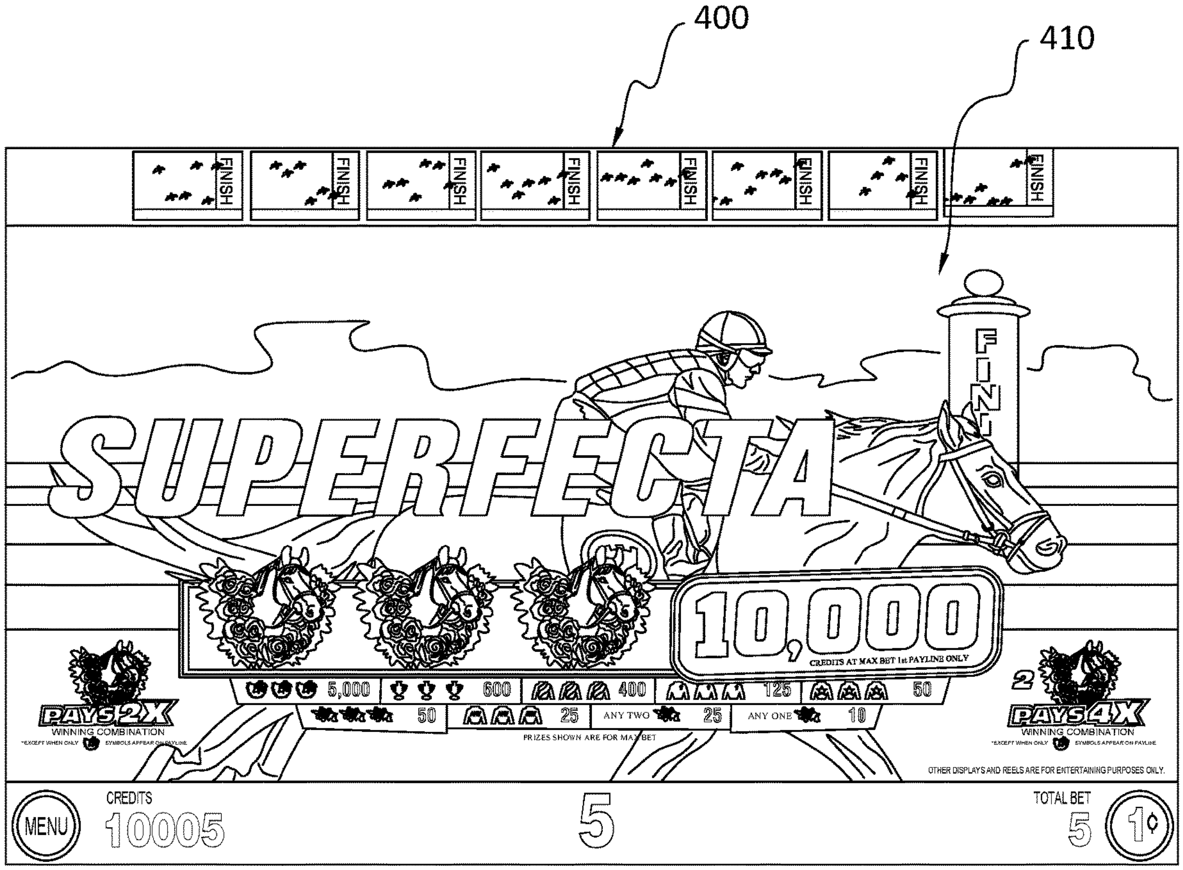
FIG. 5 illustrates a user interface including a summary window and an entertaining display for presenting entertaining content during processing of a wager.

During the presentation of the entertaining display 410, the summary window 400 can remain dedicated to illustrating the selected events. The illustration of the selected events may proceed from the creation of the performance profiles of the participants by the processor to the creation of an animation of the final ranking of the participants in the selected events as shown in FIG. 5, and then to an illustration of a final result 322 identifying the accuracy of each prediction of the player's wager, while the entertaining display 410 and/or summary window 400 may also illustrate a wager result 322.

The illustration of the final result may include a comparison of each prediction of the player's wager relative to the final result in each event without displaying the final rankings of all of the participants in the event, and selecting one of the events can similarly launch a snapshot 620 of the final rankings of all of the participants in the event 324. The animation of the final ranking of the participants may include replay information such as video clips or graphical representations of the results of various events.

Figure 6A:
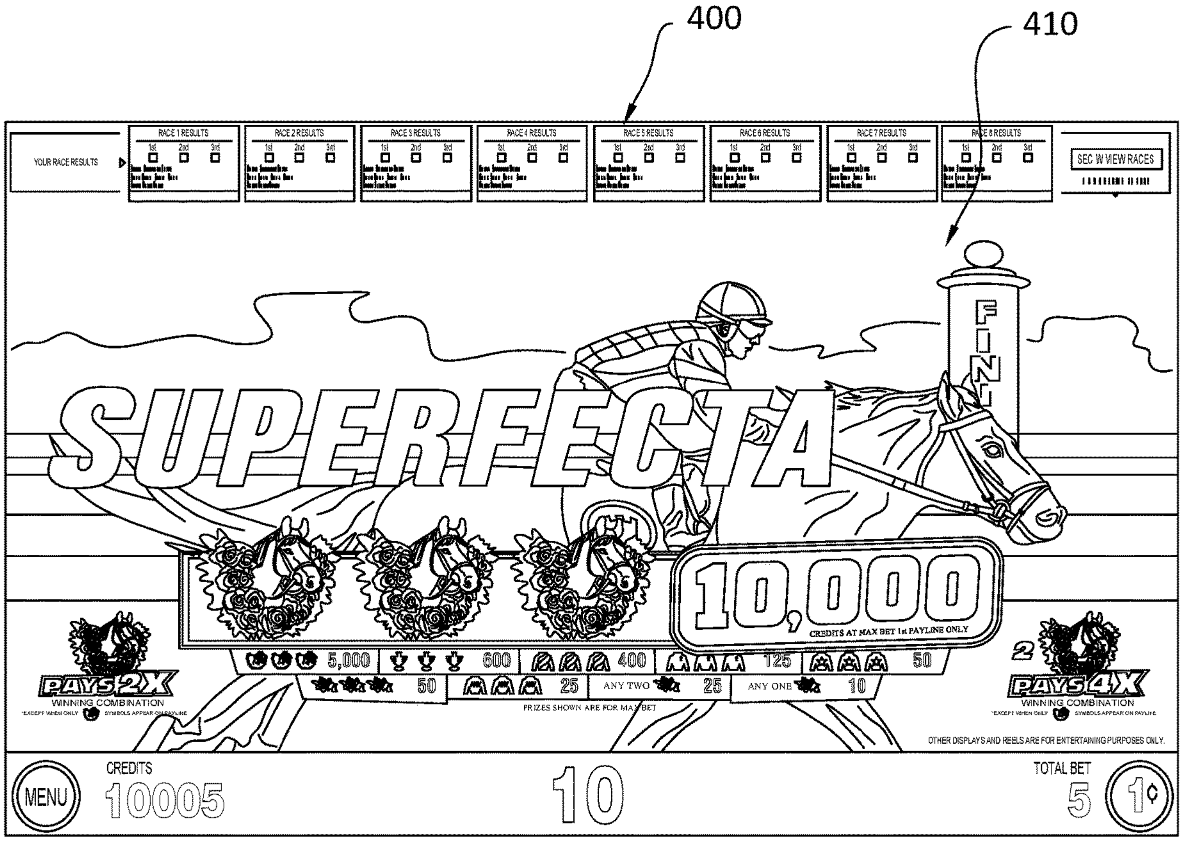
FIG. 6A illustrates a user interface including a summary window and an entertaining display for presenting output and accepting input following completion of a wager according to an embodiment of the disclosure.
Figure 6B:
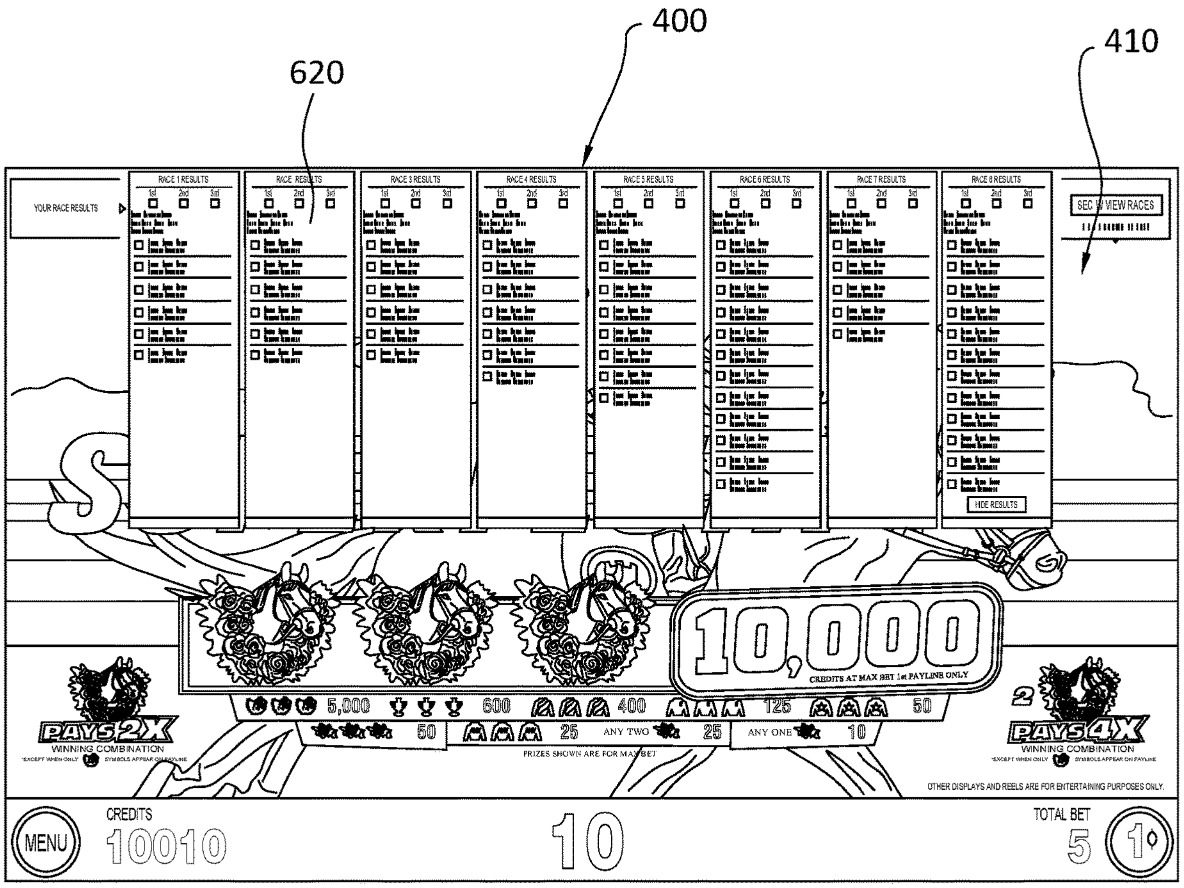
FIG. 6B illustrates a user interface including a summary window, a snapshot, and an entertaining display for presenting output and accepting input following completion of a wager according to an embodiment of the disclosure.

The interface provided after the final result of a wager is illustrated in FIGS. 6A and 6B. The snapshot 620 may be launched at the conclusion of the wager providing a detailed view of the results of the event compared to the predicted results submitted by the player. It may also include charts, graphs, statistical data, and the like explaining predicted results and actual final results for the participants in the events themselves.

The wager may end 326 with a payout, beginning another wager 300, another round, a bonus game, and/or by reverting to a menu providing additional options for the player.

The entertaining display may be based on a theme as described previously. The theme may be selected by a player based on preference and/or may be manipulated by the processor in response to a particular final result of a wager and/or a current total pool value available for a wager. The theme may include accompanying depictions and animated highlights of matching predictions as the participants complete the event. The entertaining display may include matches with graphics, symbols, and other indicia particular to the theme. One example of a theme generated by the processor in an electronic wagering device is illustrated in FIGS. 4-6B. In this example, the entertaining display includes other graphics, colors, symbols, and various indicia to enhance the overall user experience beyond the summary window 400 which facilitates the wager.

According to a preferred embodiment, the entertaining display may include mechanical components including at least one and preferably a plurality of reels 54, such as three to five reels 54, in electromechanical form with mechanical rotating reels. In one embodiment, the entertaining display 410 includes an electromechanical slot machine comprising a plurality of adjacent, rotatable reels 54 which may be combined and operably coupled with an electronic display of any suitable type. Each reel 54 displays a plurality of indicia or symbols, such as bells, hearts, fruits, numbers, letters, bars, or other images which preferably correspond to a theme associated with the gaming machine. The electromechanical reels 54 may be controlled by the processor to stop spinning in an arrangement corresponding to the final result of the player's wager. For example, the arrangement of the electromechanical wheels 54 may show a winning pattern where a player's wager results in a payout, may show a losing pattern where a player's wager does not result in a payout, or show another pattern or display representing the value won or lost by the player, as would be understood from the disclosure by one of ordinary skill in the art.

Tying the function of the electromechanical reels 54 to the wager according to the current disclosure allows the gaming machine 10 to provide the feel of a traditional gaming machine, such as a slot machine, while retaining the strategic appeal and regulatory advantages of a traditional game of skill, such as horse racing.

By providing a gaming machine and method for using the same according to the disclosed embodiments, the problems of existing gaming machines being slow, cumbersome, and confusing to use, and offering insufficient modifications to historical or other data that would enable to selection and use of a wider variety of game-related information are addressed. The gaming machine embodiments provided herein advantageously allow a player to apply a desired level of skill and insight to a gaming process while enjoying an improved gaming-machine interface, thereby increasing a player's enjoyment of the gaming machine generally.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A gaming system comprising:

a central controller comprising a processor and a memory;

a gaming machine configured to accept a wager from a user using an input device, the wager including a predicted ranking and a wager value, and to communicate the wager to the central controller; and the central controller configured to:

transmit the wager value to a single pari-mutuel pool and separate the single pari-mutuel pool into a plurality of tier levels;

retrieve event data about one or more selected events from an event database, wherein the event data includes data about one or more variables or one or more participants participating in at least one event of the one or more selected events;

transform a final outcome of the one or more variables or a final ranking of the one or more participants in the one or more events into binary scorecards corresponding to one of a plurality of award levels, the binary scorecards including possible negative predictions and positive predictions of the final ranking in binary form;

compare the predicted ranking to said binary scorecards to determine an award level for the user from the plurality of award levels; and determine a reward value based on the award level for the user and the plurality of tier levels of the single pari-mutuel pool.

2. The gaming system as set forth in claim 1, wherein each tier level of the plurality of tier levels has a different size.

3. The gaming system as set forth in claim 1, wherein each award level includes a plurality of award rates corresponding to each of the plurality of tier levels, such that the determination of the reward value includes a value from each of the plurality of tier levels determined by the plurality of award rates for the award level for the user.

4. The gaming system as set forth in claim 3, wherein the plurality of award rates vary for each award level.

5. The gaming system as set forth in claim 3, wherein the plurality of award rates of each award level vary for each of the plurality of tier levels.

6. The gaming system as set forth in claim 1, wherein the central controller is configured to separate the single pari-mutuel pool into at least five tier levels.

7. The gaming system as set forth in claim 1, wherein the plurality of tier levels are filled progressively from a first tier level to a last tier level.

8. The gaming system as set forth in claim 1, the gaming system further comprising a plurality of gaming machines.

9. The gaming system as set forth in claim 1, wherein the plurality of tier levels have a size decreasing progressively from a first tier level to a last tier level.

10. The gaming system as set forth in claim 1, wherein the plurality of tier levels have a size increasing progressively from a first tier level to a last tier level.

11. A method for conducting a game comprising:

accepting a wager from a user using an input device, the wager including a predicted ranking and a wager value;

communicating the wager to a central controller having a processor and a memory;

combining the wager value with a single pari-mutuel pool and separating the single pari-mutuel pool into a plurality of tier levels using the central controller;

retrieving event data about one or more selected events from an event database using the central controller, wherein the event data includes data about one or more variables or one or more participants participating in at least one event of the one or more selected events;

transforming a final outcome of the one or more variables or a final ranking of the one or more participants in the one or more selected events into binary scorecards corresponding to one of a plurality of award levels, the binary scorecards including possible negative predictions and possible positive predictions of the final ranking in a binary form;

comparing the predicted ranking to said binary scorecards in the central controller to determine an award level for the user from the plurality of award levels; and the central controller determining a reward value based on the award level for the user and the plurality of tier levels of the single pari-mutuel pool.

12. The method as set forth in claim 11, the method further comprising the steps of:

creating an entertaining display corresponding to the reward value determined by the central controller;

transmitting the entertaining display to the user; and providing a payout to the user, the payout including the reward value.

13. The method as set forth in claim 11, wherein the final ranking comprises a first, second and third place ranking.

14. The method as set forth in claim 11, wherein each tier level of the plurality of tier levels has a different size.

15. The method as set forth in claim 11, wherein each award level includes a plurality of award rates corresponding to each of the plurality of tier levels, such that the determination of the reward value includes a value from each of the plurality of tier levels determined by the plurality of award rates for the award level for the user.

16. The method as set forth in claim 15, wherein the plurality of award rates vary for each award level.

17. The method as set forth in claim 15, wherein the plurality of award rates of each award level vary for each of the plurality of tier levels.

18. The method as set forth in claim 11, wherein the central controller is configured to separate the single pari-mutuel pool into at least five tier levels.

19. The method as set forth in claim 11, wherein the plurality of tier levels are filled progressively from a first tier level to a last tier level.

20. The method as set forth in claim 11, wherein the plurality of tier levels have a size decreasing progressively from a first tier level to a last tier level.

21. The gaming system as set forth in claim 1, wherein the one or more selected events include one or more bingo games and the one or more variables are bingo-based variables.

22. The gaming system as set forth in claim 1, wherein the one or more events includes one or more racing events; wherein the one or more events include one or more live events; wherein the one or more events include one or more live games; wherein the one or more events include one or more live racing events; wherein the one or more events include one or more historical events; the one or more events include one or more historical games; the one or more events include one or more races; the one or more events include one or more historical horse races; and/or the one or more events include one or more historical races.

23. The method as set forth in claim 11, wherein the one or more selected events include one or more bingo games and the one or more variables are bingo-based variables.

24. The method as set forth in claim 11, wherein the one or more events includes one or more racing events; wherein the one or more events include one or more live events; wherein the one or more events include one or more live games; wherein the one or more events include one or more live racing events; wherein the one or more events include one or more historical events; the one or more events include one or more historical games; the one or more events include one or more races; the one or more events include one or more historical horse races; and/or the one or more events include one or more historical races.

* * * * *